United States Patent [19]

Matovich

[11] 4,057,396
[45] Nov. 8, 1977

[54] FLUID-WALL REACTOR FOR HIGH TEMPERATURE CHEMICAL REACTION PROCESSES

[75] Inventor: Edwin Matovich, Brea, Calif.

[73] Assignee: Thagard Technology Company, Irvine, Calif.

[21] Appl. No.: 631,912

[22] Filed: Nov. 14, 1975

Related U.S. Application Data

[63] Continuation-in-part of Ser. No. 271,560, July 13, 1972, Pat. No. 3,933,434, Ser. No. 591,949, June 30, 1975, Ser. No. 591,950, June 30, 1975, Ser. No. 606,222, Aug. 20, 1975, Ser. No. 606,246, Aug. 20, 1976, and Ser. No. 616,393, Sept. 24, 1975.

[51] Int. Cl.² .................... B01J 1/00; F27B 17/00
[52] U.S. Cl. .................... 23/252 R; 23/259.5;
23/284; 23/277 R; 23/290; 13/32; 13/20;
13/22; 219/290; 219/354; 219/121 L; 423/345;
423/349; 423/659; 423/458; 432/238; 432/8;
48/197 R; 48/209; 48/111; 48/197 A; 75/26;
208/8; 208/132; 260/679 R; 202/124; 202/99;
202/88; 201/2.5; 201/25
[58] Field of Search ............ 23/252 R, 259.5, 284,
23/227 R, 290; 432/238, 8; 13/32, 20, 22;
219/390, 354, 121 L; 423/458, 659

[56] References Cited

U.S. PATENT DOCUMENTS

| | | | |
|---|---|---|---|
| 2,062,358 | 12/1936 | Frolich | 423/458 |
| 3,371,915 | 3/1968 | Kawamura et al. | 432/8 |
| 3,719,454 | 3/1973 | Jer-Yu Shang | 23/252 R |
| 3,933,434 | 1/1976 | Matovich | 23/259.5 X |

*Primary Examiner*—James H. Tayman, Jr.
*Attorney, Agent, or Firm*—Pennie & Edmonds

[57] ABSTRACT

A fluid-wall reactor for high temperature chemical reactions comprising (A) a porous reactor tube, at least a portion of the interior of which defines a reaction zone, the tube being made of an electrically resistive, porous refractory material; (B) a pressure vessel enclosing the reactor tube to define an inert fluid plenum, the pressure vessel having at least one inlet for admitting the inert fluid which is directed under pressure through the porous tube wall to provide a protective blanket for the inside surface of the reactor tube; (C) means for introducing at least one reactant into the reaction zone, the reactants being directed in a predetermined path axially of the reactor tube and being confined by the protective blanket substantially centrally within the reaction zone; (D) means for passing an electric current through the reactor tube for heating the reactor tube to the temperature level at which it emits sufficient radiant energy to initiate and sustain the desired chemical reaction, the radiant energy being directed into the reaction zone to coincide with at least a portion of the path of the reactants; and (E) a heat shield disposed within the pressure vessel, substantially enclosing the reaction zone to define a black body cavity, the heat shield reflecting radiant energy toward the reaction zone.

43 Claims, 12 Drawing Figures

FIG. 1B

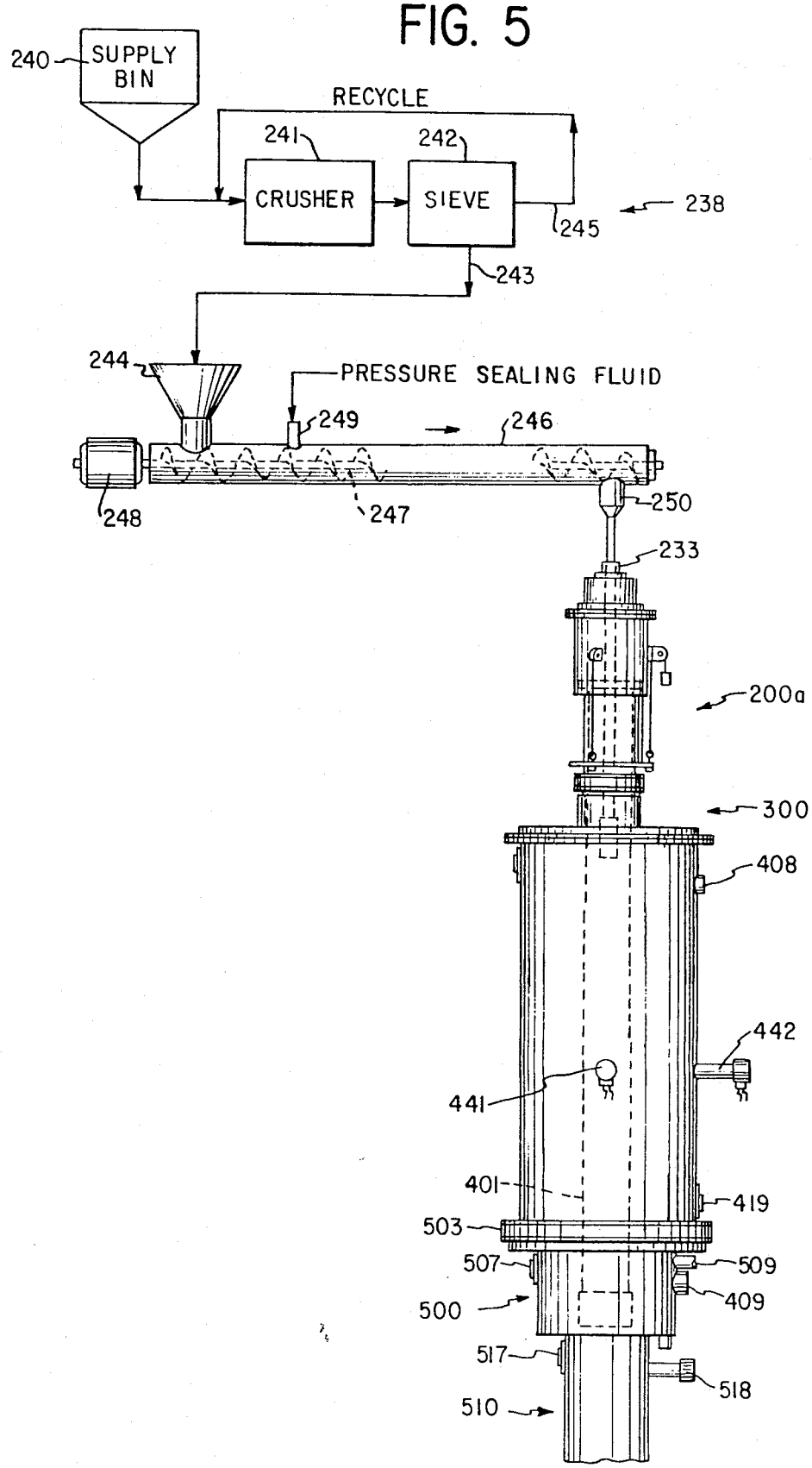

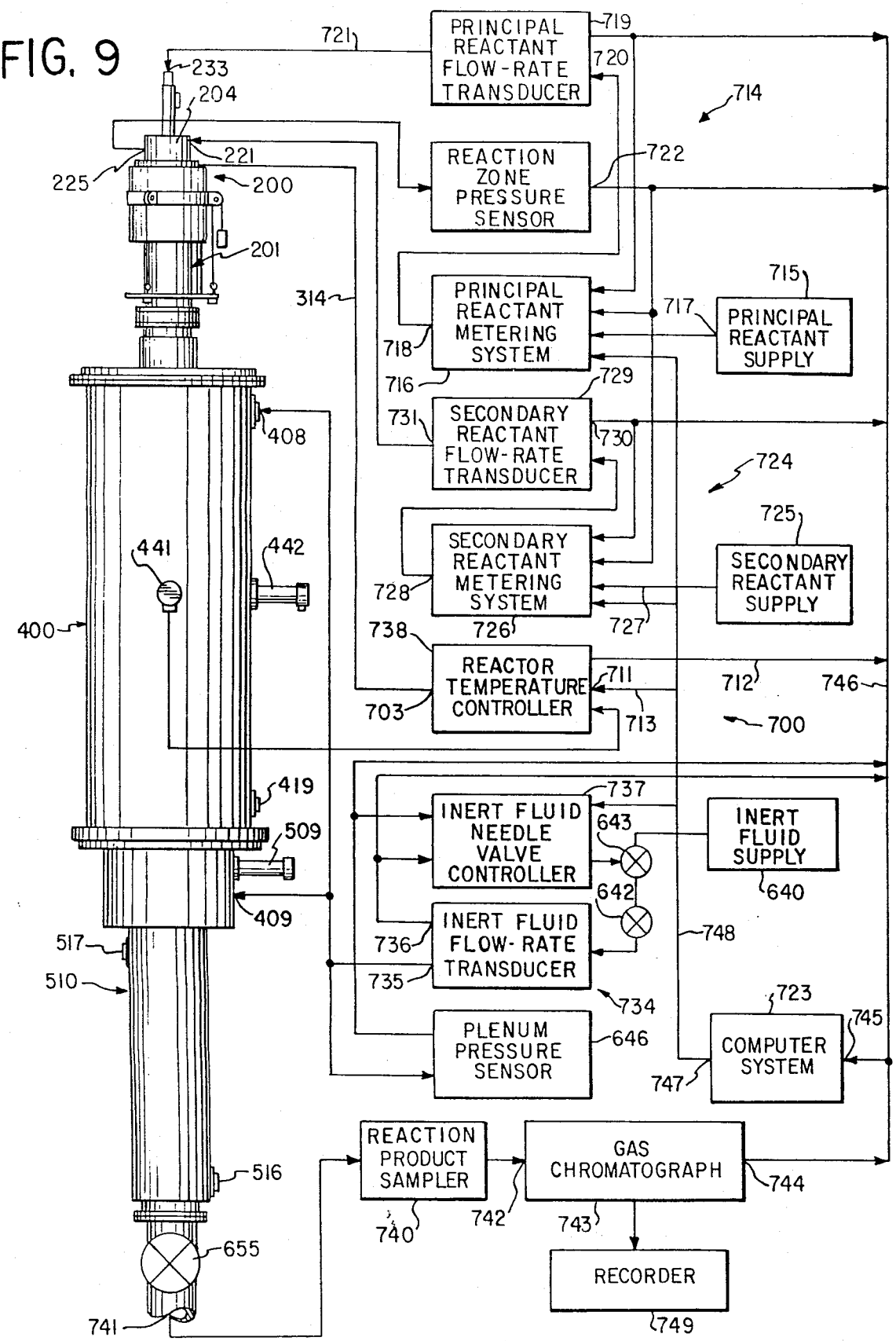

FLUID-WALL REACTOR FOR HIGH TEMPERATURE CHEMICAL REACTION PROCESSES

CROSS-REFERENCE TO RELATED APPLICATIONS

This application is a continuation-in-part of co-pending applications Ser. No. 271,560, filed July 13, 1972, now issued as U.S. Pat. No. 3,933,434, Ser. No. 591,949, filed June 30, 1975, Ser. No. 591,950, filed June 30, 1975, Ser. No. 606,222 filed Aug. 20, 1975, Ser. No. 606,246, filed Aug. 20, 1976 and Ser. No. 616,393, filed Sept. 24, 1975.

BACKGROUND OF THE INVENTION

The present invention relates generally to a fluid-wall reactor for the carrying out of many high temperature chemical reactions which previously have been regarded as impractical or only theoretically possible. The present reactor utilizes radiation coupling as a heat source, maintains the contemplated chemical reactions in isolation within a protective fluid blanket or envelope out of contact with the containing surfaces of the reactor, and provides a heat shield which substantially encloses the radiant energy heating means and the reaction zone to define a "black body cavity." As used herein, the term "black body cavity" is generally intended to denote a space which is substantially enclosed by a surface or surfaces and from which, ideally, no radiation can escape. Within the context of the present fluid-wall reactor, the heat shield constitutes the enclosing surface or surfaces of the "black body cavity" and the material from which the heat shield is fabricated (1) functions as an insulator, inhibiting the transfer of heat from within the "black body cavity," and (2) must be able to withstand the temperatures generated by the radiation coupling heat source.

High temperature reactors are presently employed to carry out pyrolysis, thermolysis, disassociation, decomposition and combustion reactions of both organic and inorganic compounds. Substantially all such reactors transfer heat to the reactants by convection and/or conduction, but this characteristic inherently produces two major problems which limit the nature and scope of the reactions which may be carried out. Both problems result from the fact that in a conventional reactor which transfers heat to the reactants by convection, the highest temperature in the system is necessarily at the interface between the inside wall of the reactor and the reactant stream.

The first problem involves the limitations on available temperatures of reaction which are imposed by the strength at elevated temperatures of known reactor wall materials. The decreasing capability of such materials to maintain their integrity under conditions of increasing temperature is, of course, well known. However, since it is necessary that such materials be heated in order that thermal energy may be transferred to the reactant stream, available reaction temperatures have been limited by the temperature to which the reactor wall could be safely heated. This factor is particularly critical in cases where the contemplated reaction either must take place at or produces high pressures.

The second problem inherently results both because the wall of a conventional reactor is at the highest temperature in the system and because convective/conductive heat transfer requires contact between the wall and the reactant stream. Being at such elevated temperature, the reactor wall is an ideal if not the most desirable reaction site in the system and, in many instances, reaction products will accumulate and build up on the wall. Such build-up impairs the ability of the system to transfer heat to the reactants and this ever increasing thermal impedance requires the source temperature to be raised progressively just to maintain the initial rate of heat transfer into the reactant stream. Obviously, as the build-up increases, the required source temperature will eventually exceed the capabilities of the reactor wall material. Moreover, as additional energy is required to sustain the reaction, the process become less efficient in both the technical and economic sense. Thus, at the point where the contemplated reaction can no longer be sustained on the basis of either heat transfer, strength of materials or economic considerations, the system must be shut down and cleaned.

Usually, cleaning is performed mechanically by scraping the reactor wall or chemically by burning off the deposits. In some continuous processes, it has been attempted to scrape the reactor wall while the reaction proceeds. However, the scraping tool itself necessarily gets hot, becomes a reaction site and, thereafter, must be cleaned. In any event, this down time represents a substantial economic loss. In many instances, a second system will be installed in order to minimize lost production time. However, such additional equipment generally represents a substantial capital investment. Some high temperature chemical reactors include a tube which is heated to a temperature at which its inner walls emit sufficient radiant energy to initiate and sustain the reaction. However, as in the case of conductive and convective reactors, for reactions yielding solid products there is frequently an undesirable build-up of product on the tube walls which leads to reduced heat transfer and even clogging of the tube.

The apparatus for the manufacture of carbon black disclosed in U.S. Pat. No. 2,062,358 includes a porous tube disposed within a heating chamber. Hot gas is directed from a remote furnace into the chamber, and thereafter forced through the wall of the porous tube to mix with the reactants. Thus, only convective transfer of heat from a fluid to reactants is employed. This, together with the absence of a heat shield and a "black body cavity," necessitates the flow of a large volume of fluid through the heating chamber in order to make up for the heat losses. Like many furnaces which operate on the principle of convective heat transfer, such apparatus may use electrical heat sources. Although the file history contains a remark that the patentee contemplated a porous tube "provided with an internal lining of electrical resistance," such was apparently contemplated as an ultimate means to heat the gas and not to provide a source of radiant energy. Moreover, since different materials ordinarily have differing coefficients of thermal expansion, changing the temperature of a porous tube composed of an electrically resistive lining affixed in surface-to-surface relationship to an electrically insulating backing would be expected to subject the tube to substantial shear stresses. Repeated heating of such composite tube to the temperatures contemplated by the present reactor, for example, would be expected to cause failure of the bond between the lining and the backing.

U.S. Pat. No. 2,769,772 discloses a reactor for heat-treating fluid materials such as hydrocarbons which includes two concentric tubes disposed in a flame heated furnace. Reactants flow axially through the pervious inner concentric tube. A heat-carrier gas flowing in the annular chamber between the concentric tubes is heated by contact with the outer wall. Fluids in the inner tube are heated by convection when the heat-carrier gas passes through the pervious wall and mixes with them. Radiant heat transfer is expressly avoided. In fact, it is impossible to heat the inner tube without simultaneously heating the outer tube to at least as high a temperature.

The surface-combustion cracking furnace of U.S. Pat. No. 2,436,282 employs the convective heat carrier gas principle similar to that of U.S. Pat. No. 2,769,772. The furnace includes a porous, refractory tube enclosed by a jacket. A combustible fluid from an annular chamber is forced through the porous wall to the inside of the tube where it is ignited. It is evident, however, that the combustible fluid in the annular chamber will explode unless it is forced through porous wall at a rate faster than the rate of flame propagation back through the wall. Likewise, the temperature in the annular chamber must be maintained below the ignition temperature of the gas/air mixture. Combustion products from the surface flame mix with reactants in the furnace diluting and possibly reacting with them. Heat is imparted to the reactants by convective mixing of the combustion products and the reactants.

U.S. Pat. Nos. 2,670,272; 2,670,275; 2,750,260; 2,915,367; 2,957,753; and 3,499,730 disclose combustion chambers for producing pigment-grade titanium dioxide by burning titanium tetrachloride in oxygen. In the U.S. Pat. No. 2,670,275, which is representative of this group of references, titanium tetrachloride is burned in a porous, refractory tube. An inert gas is continuously diffused through porous tube into combustion chamber where it forms a protective blanket on the inner surface of the tube. This gaseous blanket substantially reduces the tendency of the titanium dioxide particles to adhere to the walls of the reactor. Since the combustion of titanium tetrachloride is an exothermic reaction, no provision is made to supply heat to the reaction mixture as it passes through tube. In fact, the U.S. Pat. No. 2,670,275 teaches that it is advantageous to remove heat from reactor chamber either by exposing the porous tube assembly to the atmosphere or by circulating a cooling fluid through a coil disposed about the porous tube.

SUMMARY OF THE INVENTION

The fluid-wall reactor of the present invention transfers substantially all of the required heat to the reactants by radiation coupling. The reactor comprises a tube having an inlet end and an outlet end, at least a portion of the interior of the tube defining a reaction zone; the reactor tube is made of an electrically resistive, porous refractory material capable of emitting sufficient radiant energy to raise the temperature of reactants within the reaction zone to a level required to initiate and sustain the desired chemical reaction. The pores of the refractory material are of such diameter as to permit a uniform flow of sufficient inert fluid which is substantially transparent to radiant energy through the tube wall to constitute a protective blanket for the radially inward surface of the reactor tube. A fluid-tight, tubular pressure vessel encloses the reactor tube to define an inert fluid plenum between the reactor tube and the pressure vessel, the inlet and outlet ends of the reactor tube being sealed from the plenum. The pressure vessel has at least one inlet for admitting the inert fluid which is directed under pressure into the plenum and through the porous tube wall into the reaction zone. The reactor further includes means for introducing at least one reactant into the reaction zone through the inlet end of the reactor tube. Thereafter, the reactants are directed in a predetermined path axially of the reactor tube and are confined by the protective blanket substantially centrally within the reaction zone and out of contact with the inner wall of the reactor tube. The reactor further comprises means for passing an electric current through the reactor tube for heating the reactor tube to the temperature level at which it emits sufficient radiant energy to initiate and sustain the desired chemical reaction. The radiant energy is directed into the reaction zone substantially coincident with at least a portion of the path of the reactants. A heat shield is disposed within the pressure vessel substantially enclosing the reaction zone to define a black body cavity. The heat shield reflects radiant energy inwardly toward the reaction zone.

In contrast to the conventional convective reactors, the present invention relies upon radiation coupling to transfer heat to the reactant stream. The amount of heat transferred is independent both of physical contact between the reactor wall and the stream and of the degree of turbulent mixing in the stream. The primary consideration for heat transfer in the present system is the radiation absorption coefficient ($\alpha$) of the reactants. The inert fluid blanket which protects the reactor wall is desirably substantially transparent to radiation and thus exhibits a very low value of ($\alpha$). This enables radiant energy to be transferred through the blanket to the reactant stream with little or no energy losses. Ideally, either the reactants themselves or a target medium will exhibit high ($\alpha$) values and will thus absorb large amounts of energy, or alternatively, the reactants may be finely divided (as in a fog) such that the radiation is absorbed by being trapped between the particles. Since materials which are good absorbers are generally good emitters of radiation, when the reactants or targets are raised to a sufficiently high temperature, they become secondary radiators which re-radiate energy throughout the entire reacting volume and further enhance the heat transfer characteristics of the system. This occurs almost instantaneously and is subject to precise and rapid control. Moreover, the re-radiation phenomenon which ensures rapid and uniform heating of the reactants is completely independent of the degree of turbulent mixing which may exist in the reactant stream.

The present fluid-wall reactor for high temperature chemical reactor process provides a solution to problems which have plagued industry. Because heat is supplied by radiation coupling rather than by convection and/or conduction, the temperature of the reactant stream may be independent of both the temperature of the pressure vessel wall and of the condition of the reactant stream, and the serious strength of materials problem is overcome. Although it provides a heated wall as a source of radiant energy, the reactor tube of the present invention is not subjected to the high pressures which are normally attendant to many kinds of reactions. For this reason, refractory materials which are not suitable for use as a wall material in a conventional reactor may be successfully employed. This feature permits reaction temperatures far in excess of those presently achievable and reactions which had been only theoretically feasible may be carried out.

One embodiment of the present invetion features a reactor tube made of a fabric of an electrically resistive, fibrous refractory material. Carbon cloth, the preferred electrically resistive, refractory material for this reactor tube, is relatively inexpensive, readily available, and may be formed into reactor tubes substantially larger than those of cast porous carbon presently available. Since carbon cloth is normally flexible, any attempt to force an inert gas radially inwardly through a reactor tube of such material would ordinarily cause the tube to collapse. Accordingly, an embodiment of the present invention contemplates the depositing of a layer of pyrolytic graphite on the cloth to stiffen it sufficiently to withstand the pressure differential maintained between the inert fluid plenum and the reaction zone. Depositing a layer of pyrolytic graphite on the cloth also permits control of the porosity of the fabric.

The provision of the protective inert fluid blanket, which is made possible largely by the use of radiation coupling, isolates the reactor wall from the reactant stream and makes it impossible under normal operating conditions for any precipitates or other deposits to accumulate and clog the system. In the event a corrosive blanket fluid such as steam is to be used, surfaces of the reactor tube and heat shield which are maintained at high temperatures and in contact with the blanket gas when the reactor is in operation may be coated with a thin layer of refractory oxide such as thorium oxide, magnesium oxide, or zirconium oxide. The refractory oxide may be deposited on these surfaces by heating the reactor to above the dissociation temperature of a volatile metal-containing compound, introducing this compound into the reactor chamber and allowing it to dissociate, depositing a layer of metal on the heated surfaces. Thereafter, a gas or other suitable material (such as molecular oxygen) may be introduced into the reactor chamber to oxidize the metal layer, forming the desired refractory oxide. Alternatively, the refractory coating may be achieved in a single step if a volatile metal-containing compound which pyrolyzes directly to an oxide is employed as a refractory deposition agent.

The use of radiation coupling further enables the accurate and almost instantaneous control of heat transfer rates which is impossible to achieve in a conventional convective reactor. And, the use of a heat shield to provide the containing surface or surfaces of a black body cavity within which all reactions take place, enables the achievement of unusually favorable thermal efficiencies.

The present invention makes available for the first time on a large scale a source of thermal energy which has never been harnessed in this manner.

BRIEF DESCRIPTION OF THE DRAWINGS

FIGS. 1A, 1B, 1C, and 1D together constitute a composite elevation in partial section of one embodiment of the reactor of the present invention; the integral structure of the reactor has been divided along lines A—A, B—B and C—C, respectively, in order to provide an illustration of sufficient size to show clearly certain structural details;

FIG. 5 is an elevation/schematic view of a reactor of the present invention in combination with apparatus for pre-processing and introducing solid reactants into an inlet assembly of the reactor of the present invention;

FIG. 9 is a schematic representation illustrating the operation of several control systems of the reactor of the present invention.

DESCRIPTION OF THE PREFERRED EMBODIMENTS

Figure 1A:
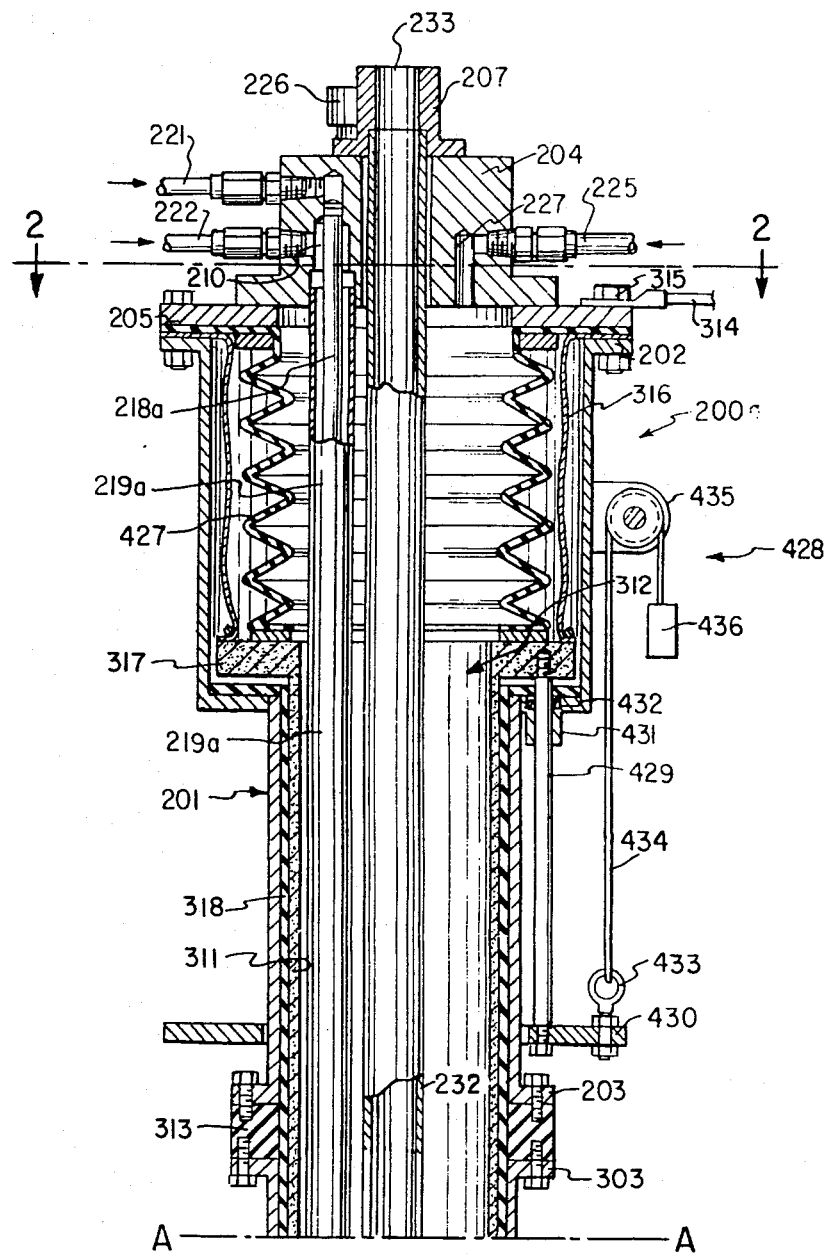

Referring to FIGS. 1A through 4, inclusive, the present high temperature chemical reactor generally comprises an inlet assembly 200, an electrical connection assembly 300, a main assembly 400, and a post-reaction treatment assembly 500. The principal elements of the present reactor include:

A. A reactor tube 401 which has an inlet end 402 and an outlet end 403; at least a portion of the interior of the tube 401 defining a reaction zone 404. The reactor tube 401 is connected to a first conductive tube 310, which in turn is joined to a second conductive tube 311. The reactor tube 401 is made of a fabric of an electrically resistive, fibrous refractory material capable of emitting sufficient radiant energy to raise the temperature of reactants within the reaction zone 404 to a level required to initiate and sustain the desired chemical reaction when an electric current of sufficient magnitude is passed through it. The fabric has a multiplicity of pores of such diameter as to permit a uniform flow of sufficient inert fluid which is substantially transparent to radiant energy through the tube wall to constitute a protective blanket for the radially inward surface of the reactor tube 401. As used herein, the terms "radiant energy" and "radiation" are intended to encompass all forms of radiation including high-energy or impacting nuclear particles. However, because the practical use of such radiation is not possible under the present state of the art, black body or other electromagnetic radiation, particularly of wavelengths ranging from about 100 microns to 0.01 microns, is considered to be the primary energy source upon which design considerations are to be based. Similarly, as used herein, the term "inert fluid" is intended to denote a gas, liquid or vapor which has a low coefficient of absorption ($\alpha$), and, as such, is substantially transparent to radiation. Fluids which are suitable for this purpose include simple gases such as helium, neon, argon, krypton and xenon; complex gases which do not decompose to form a solid product such as hydrogen, nitrogen, oxygen and ammonia; and, liquid or gaseous water. The term "inert," as used herein, involves two factors: the ability of the fluid to react chemically with the material of the reactor tube 401 and the ability of the fluid to react chemically with the materials which are being processed. Thus, the selection of an "inert" blanket fluid depends in each instance upon the particular environment. Except as otherwise specifically provided, it is desirable that the fluid be inert with respect to the reactor tube and it is usually desirable that the fluid be inert with respect to the particular reaction being carried out. However, it is contemplated that in some instances the "inert" fluid of the protective blanket shall also participate in the reaction as, for example, where iron or carbon particles are reacted in the presence of a steam blanket to produce iron oxide and hydrogen or carbon monoxide and hydrogen, respectively.

B. A fluid-tight, tubular pressure vessel (which has an inlet assembly section 201, a plenum header pressure vessel section 301, a main assembly section 405, and a post-reaction treatment assembly section 501) encloses the reactor tube 401 and the conductive tubes 310 and 311 to define an inert fluid plenum 406 between the tubes 401, 310, and 311 and the pressure vessel. The inlet end 402 and the outlet end 403 of the reactor tube 401 are respectively sealed from the plenum 406. The pressure vessel has a first inlet 408 and a second inlt 409 for admitting the inert fluid which is directed under pressure into the plenum 406 and through the porous tube wall 401 into the reaction zone 404.

C. Means for introducing reactants, either gaseous, liquid, or solid, into the reaction zone 404 through the inlet end 402 of the reactor tube 401. The reactants are directed in a predetermined path axially of the reactor tube 401 and are confined by the protective blanket substantially centrally within the reaction zone 404 and out of contact with the inner wall of the reactor tube 401.

D. Means, inluding conductive tubes 310 and 311, for passing an electric current through the reactor tube 401 for heating the reactor tube to the temperature level at which it emits sufficient radiant energy to initiate and sustain the desired chemical reaction. The radiant energy is directed into the reaction zone 404 substantially coincident with at least a portion of the path of the reactants.

E. A heat shield 410 which is disposed within the pressure vessel substantially enclosing the reaction zone 404 to define a black body cavity. The heat shield 410 reflects radiant energy inwardly toward the reaction zone 404.

A. INLET ASSEMBLY

Figure 1B:
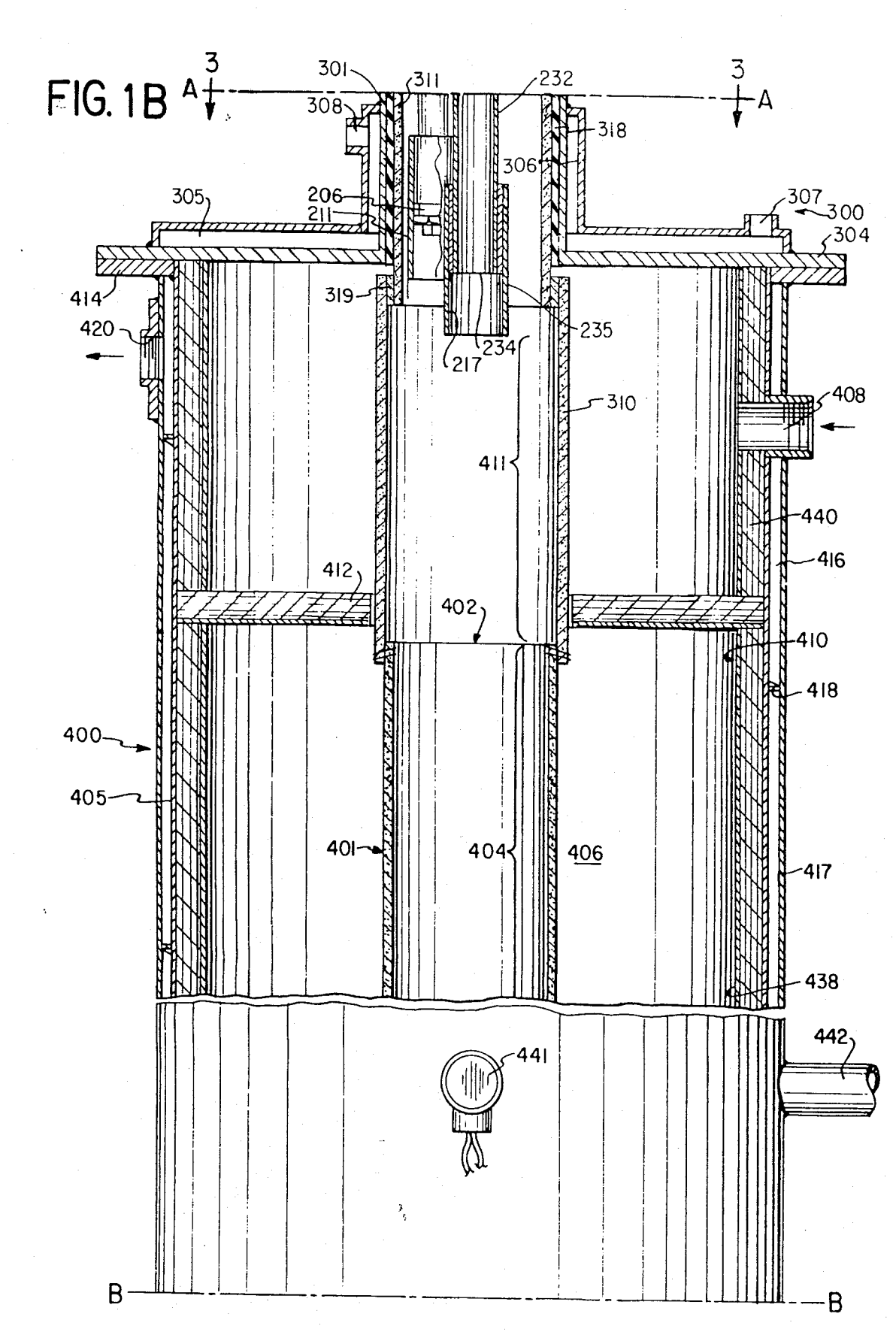
Figure 2:
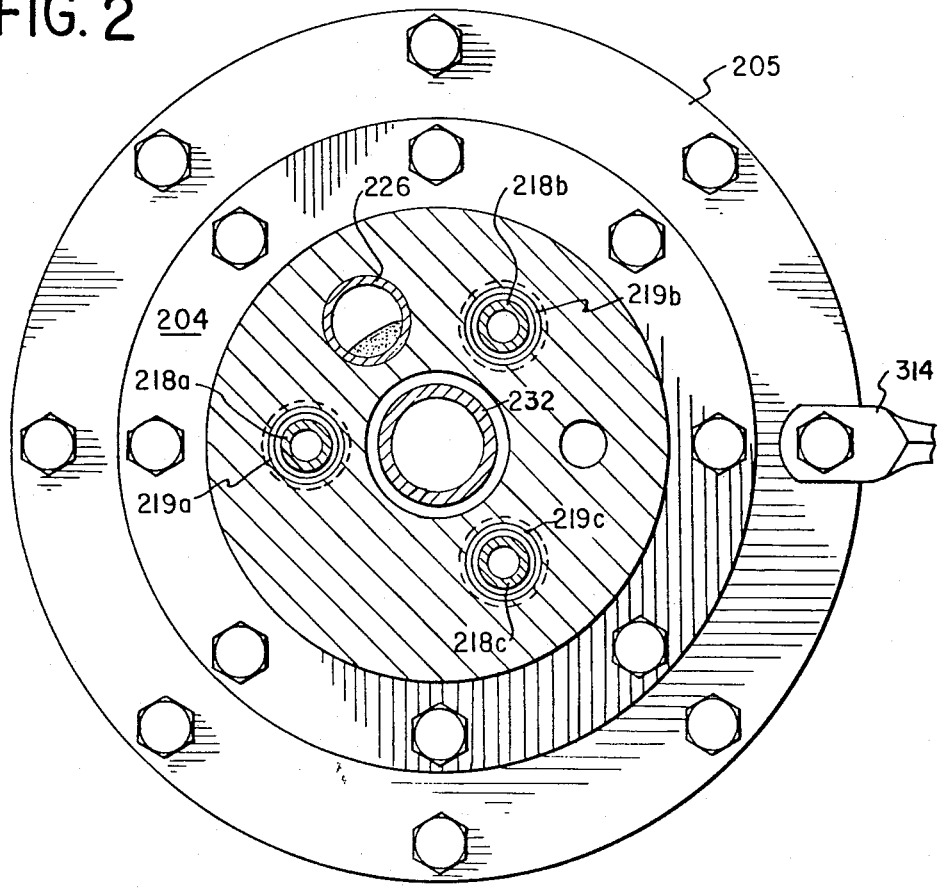
FIG. 2 is a section taken substantially along line 2—2 of FIG. 1A.

Referring particularly to FIGS. 1A and 2, the pressure vessel inlet assembly section 201 is a tubular member having first and second flanges, 202 and 203, at its respective ends. An annular nozzle block 204 is secured to an annular sealing flange 205 which, in turn, is secured in fluid-tight relationship to the first flange 202 of the inlet assembly pressure vessel section 201. A reactant inlet tube 232 extends through the annular nozzle block 204 and is fixedly secured thereto by a support flange 207. A principle solid reactant, preferably finely divided, enters inlet tube through inlet 233 in support flange 232 and exits within the first conductive tube 310 adjacent a prereaction zone 411, as shown best in FIG. 1B. Secured to and disposed radially outwardly of outlet 234 is a tubular shroud 235, the axis of which is substantially parallel to the axis of the reactor tube 401. Shroud 235 assists in containing finely divided solid reactants centrally within the prereaction zone 411.

First conductive tube 310 is made of an electrically conductive, porous material whose pores are of sufficient diameter to permit a uniform flow of inert fluid radially inward through the tube to form a fluid blanket on the inside surface of the tube to assist in containing reactants centrally within prereaction zone 411.

Figure 3:
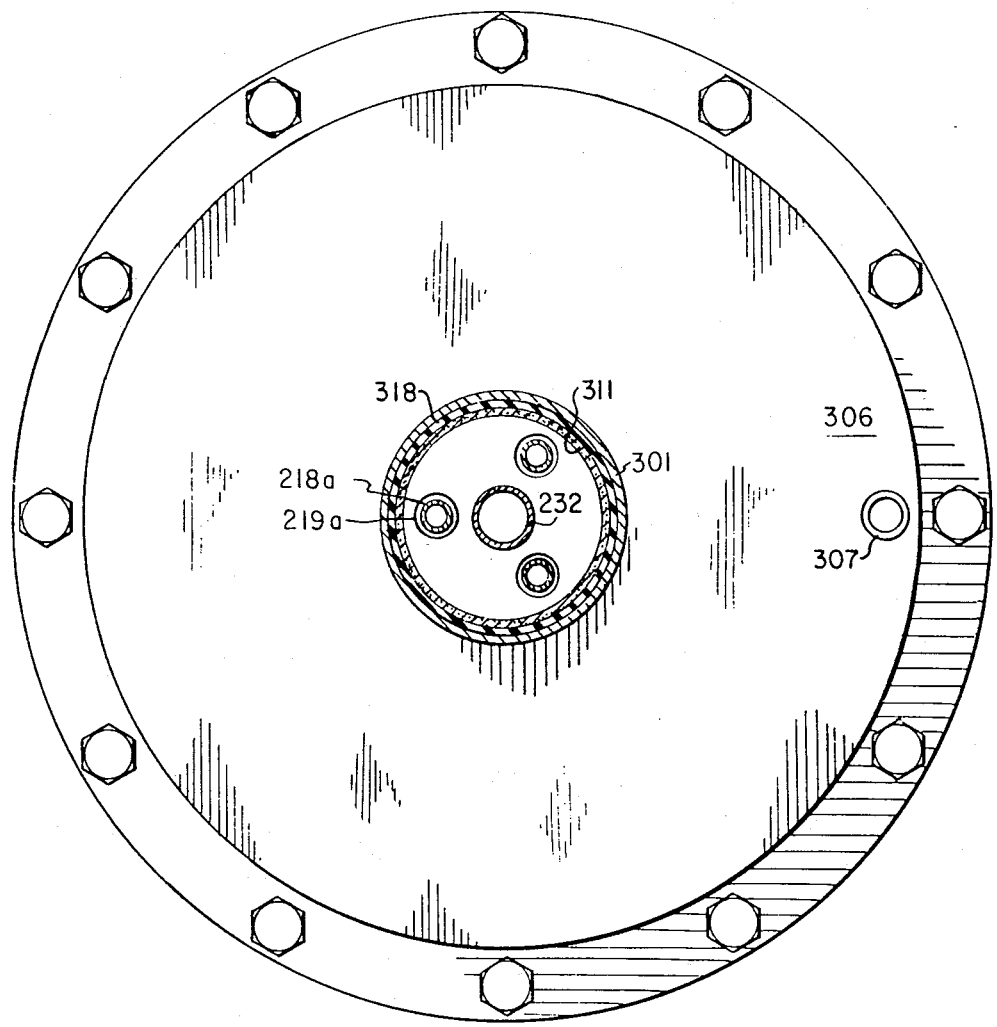
FIG. 3 is a section taken substantially along line 3—3 of FIG. 1B.

As shown best in FIGS. 1A, 2 and 3, the inlet assembly of the preferred embodiment of the present reactor may further include a plurality of secondary inlet tubes 218a, 218b, and 218c which permit the introduction of liquid reactants as fogs. A representative inlet for a liquid reactant and a representative inlet for an atomizing gas are designated by reference numerals 221 and 222, respectively.

A first atomizing gas inlet tube 219a extends into and is fixedly secured to the annular nozzle block 204. An atomizing gas enters a plenum 210 through inlet 222. A first liquid reactant inlet tube 218a is disposed within the first atomizing gas inlet tube 219a and extends substantially coextensively therewith. A first liquid reactant enters the tube 218a through inlet 221. As best shown in FIG. 1B, a fogging nozzle 206a is secured to the outlet end of both the first atomizing gas inlet tube 219a and the first liquid reactant inlet tube 218a. The fogging nozzle 206a includes a tubular shroud 211 which is secured to and disposed radially outwardly of the nozzle as shown. The axis of the shroud 211 is substantially parallel to the axis of the reactor tube 401. In operation, the liquid reactant and the atomizing gas are directed under pressure through tubes 218a and 219a, respectively, and, under pressure, are mixed within the nozzel 206a. The liquid reactant is thus dispersed from the nozzle outlet as a fog which absorbs radiant energy. The shroud 211 serves to assist in containing the liquid reactant fog within the pre-reaction zone 411.

The above discussion presumes that the reactants themselves either exhibit a relatively high radiation absorption coefficient ($\alpha$) or can be converted into a fog which absorbs radiant energy. However, if such is not the case, a radiant energy absorptive target must be introduced into the reaction zone 404 coincident with at least one point along the path of the reactants. The target medium may be a finely divided solid such as carbon powder or other suitable material which enters the reaction zone together with the reactants and absorbs sufficient radiant energy to raise the temperature of the reactants of the required level. Alternatively, the target may be a liquid such as tar, asphalt, linseed oil or diesel oil, and may include solutions, dispersions, gels and suspensions of varied make-up which may be readily selected from available materials to suit particular requirements. The target may be a gas which preferably exhibits absorption in the electromagnetic spectrum from about 100 microns to about 0.01 microns; such gases include ethylene, propylene, oxides of nitrogen, bromine, chlorine, iodine, and ethyl bromide. The target may also be a solid element made of a material such as carbon which is disposed in the reaction zone 404 along at least a portion of the path of the reactants.

Referring particularly to FIG. 1A, a sweep gas assists in directing the liquid reactant fog toward the reaction zone 404. The sweep gas enters nozzle block 204 through sweep gas inlet fitting 225, passes through channel 227 and is directed axially of the reactor tube 401 toward the pre-reaction zone 411.

As shown in FIGS. 1A and 2, a reaction viewport 226 provides an axial view into the reaction zone 404.

B. PLENUM HEADER ASSEMBLY

Figure 1C:
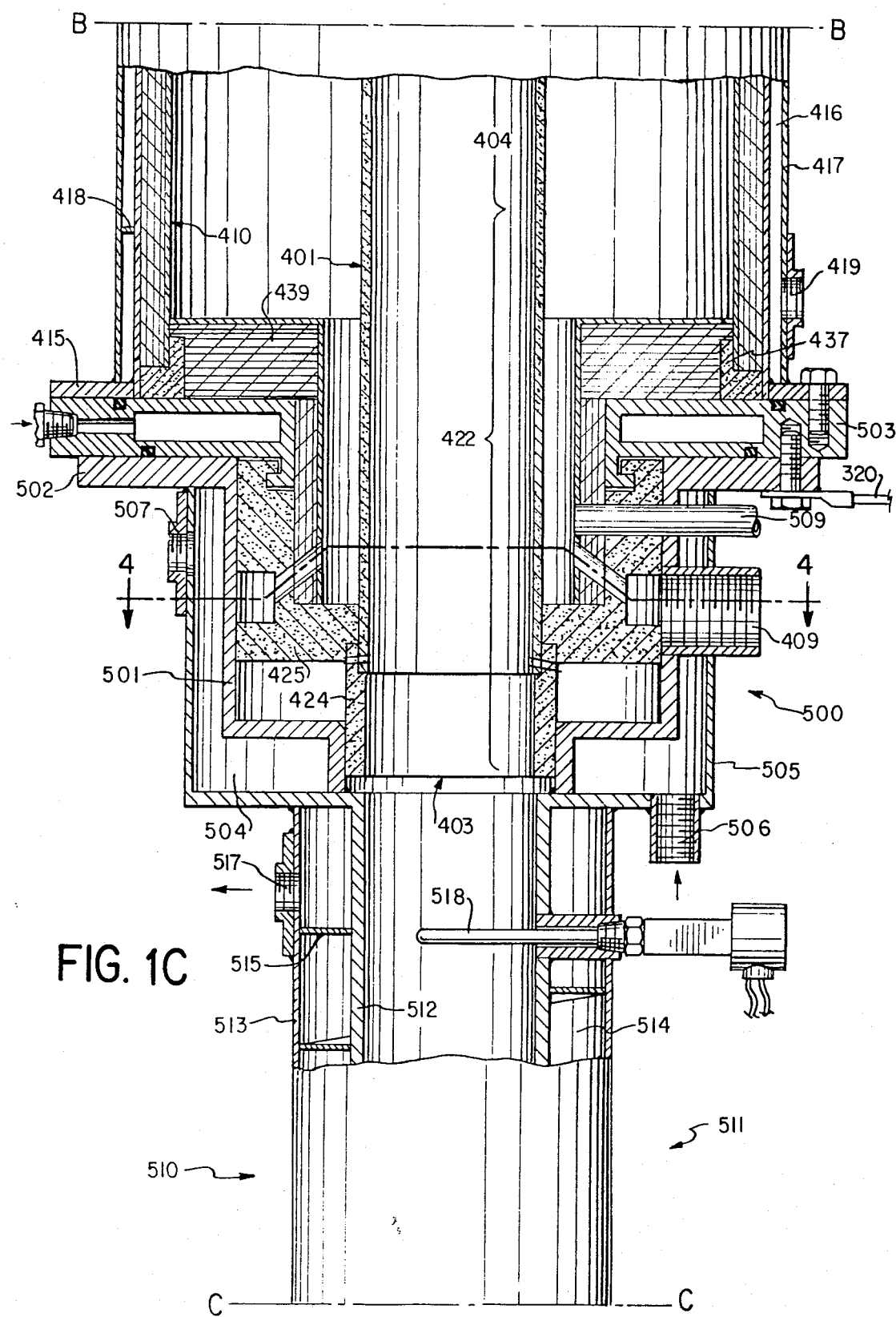

Referring particularly to FIGS. 1B, 1C, and 2 the plenum header pressure vessel section 301 has first and second flange portions 303 (shown in FIG. 1A) and 304, respectively. A coolant channel 305 is defined between the plenum header electrical assembly pressure vessel section 301 and an electrical connection assembly cooling jacket 306. Coolant enters the channel 305 through inlet 307 and exits through outlet 308. An annular insulating ring 313 is secured in fluid-tight relationship respectively to the first flange 303 of the plenum header pressure vessel section 301 and to the second flange 203 of the inlet assembly pressure vessel section 201. The insulating ring 313 provides electrical insulation between the inlet assembly pressure vessel section 201 and the remainder of the pressure vessel.

As shown in FIGS. 1A and 2, an electrical power supply conduit 314 is secured to the annular sealing flange 205. A conductive bolt 315 provides an electrical connection between power supply conduit 314 and the first flange 202 of the inlet assembly pressure vessel section 201, which is made of a conductive material. Copper braid 316 is secured respectively to the flange 202 and to a conductive support flange 317 of the second conductive tube 311 and provides a path for electric current between the two flanges 202 and 317.

The second conductive tube 311 is made of an electrically conductive, non-porous materail such as solid carbon or a metal. The second conductive tube 311 is electrically insulated from the inlet assembly pressure vessel section 201 and from the plenum header pressure vessel section 301 by an insulating layer 318. The second conductive tube 311 is joined to one end of the first conductive tube 310 with a conductive annular spacer ring 319. The opposite end of the first conductive tube 310 is secured to the reactor tube 401. The first conductive tube 310 is made of an electrically conductive, porous material such as porous carbon or graphite. Thus electric current may flow between the electric power supply conduit 314 and the reactor tube 401 through the conductive bolt 315, the flange 202, the copper braid 316, the second conductive tube 311, the conductive spacer ring 319, and the first conductive tube 310. Preferably, the conductivity of the second tube 310 is such that no substantial heating of the reactants occurs in the pre-reaction zone 411.

As shown best in FIG. 1C, the reactor tube 401 is secured at its outlet end 403 to a reactor tube outlet support ring 424 which, in turn, is secured in place by a reactor tube anchor block 425. The reactor tube anchor block 425 is in electrical contact with a post-reaction treatment assembly pressure vessel section 501, to which is secured an electric power ground return conduit 320. The reactor tube outlet support ring 424, the reactor tube anchor block 425, and the post-reaction treatment assembly pressure vessel section 501 are all made of electrically conductive materials so that electric current may flow from the reaction tube 401 to the electric power ground return conduit 320.

In operation, an AC or DC electric voltage is applied between the electric power supply conduit 314 and the electric power ground return conduit 320, which causes an electric current to pass through the reactor tube 401. The annular insulating ring 313 prevents the pressure vessel from shorting out the reactor tube 401. The reactor tube 401 is made of an electrically resistive, porous, refractory material so that passing a sufficiently large current through it causes it to become heated to a temperature at which it emits sufficient radiant energy to initiate and sustain the desired chemical reactions.

C. MAIN ASSEMBLY OF THE REACTOR

Figure 4:
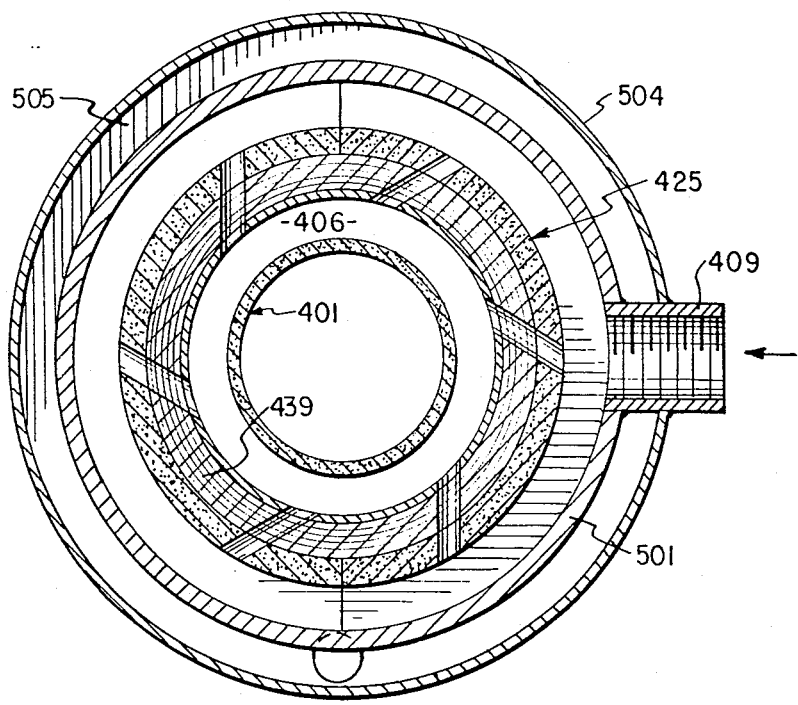
FIG. 4 is a section taken substantially along line 4—4 of FIG. 1C.

Referring to FIGS. 1B, 1C and 4, the tubular main assembly pressure vessel section 405 has first and second flange portions 414 and 415, respectively. Section 405 is secured at its first flange 414 in fluid-tight relationship to the second flange 304 of the plenum header pressure vessel section 301. A main assembly coolant channel 416 is defined between the main assembly pressure vessel section 405 and a main assembly cooling jacket 417. The channel 416 is further defined by a spiral baffle 418. Coolant enters the spiral channel 416 through inlet 419 and exits through outlet 420.

The reactor tube 401 includes two zones: the reaction zone 404 and a post-reaction zone 422. As previously stated, the reactor tube 401 is made of a fabric of electrically resistive, fibrous refractory material such as carbon or graphite. The fabric may be knitted, woven, or non-woven.

The conductive support flange 317 of the second conductive tube 311 is joined in fluid-tight relationship to a tubular bellows 427 disposed within the pressure vessel inlet assembly section 201. An inlet end of the bellows 427 is secured in a fluid-tight manner between the first flange 202 of the pressure vessel inlet assembly section 201 and the annular sealing flange 205 to insure that an inlet end 312 of the second conductive tube 311 and therefore the inlet end 402 of the reactor tube 401 remain sealed from the plenum 406. The bellows 427 is deformable to accommodate axial expansion and contraction of the reactor tube 401 and conductive tubes 310 and 311.

Means for applying an axial tensile force to the reactor tube 401 comprises three identical assemblies spaced equidistant about the circumferential surface of the pressure vessel inlet assembly section 201. For convenience, the assembly 428 which is illustrated in FIG. 1A shall be described. Each assembly 428 includes a translatable push rod 429 secured at one end to the conductive support flange 317 of the second conductive tube 311 and at an opposite end to an annular plate 430. Each push rod 429 is supported in a bearing 431 which is sealed in a fluid-tight manner by O-ring 432. Eye-bolt 433 which is secured to the annular plate 430 anchors a cable 434 which extends generally parallel to the longitudinal axis of the reactor and over a pulley assembly 435. A weight 436 secured to an opposite end of the cable 434 applies a force to the second conductive tube 311 which maintains the reactor tube 401 in axial tension.

Referring particularly to FIGS. 1B and 1C, the heat shield 410 includes a first circumferential section 438 which is disposed within the pressure vessel main assembly section 405, radially outwardly of the reaction zone 404 and between the first end section 412 and a second end section 439 of the heat shield 410. As shown in FIG. 1C, the first circumferential section 438 of heat shield 410 rests in a seating ring 437 which is preferably made of carbon. If desired, the first circumferential portion of the heat shield 410 may be extended in a direction toward the electrical connection assembly 300 to include a second circumferential portion 440 as shown in FIG. 1B.

In that the heat shield 410 reflects rather than transfers heat, it functions as an insulator and may thus be made of any material which exhibits this characteristic and which can withstand the temperatures generated by the reactor tube 401. Although molybdenum has been found to be a satisfactory material for a heat shield of a type required in the present high temperature chemical reactor, it is preferred that the heat shield 410 be made of a graphitic material such as pyrolytic graphite or a material manufactured by Union Carbide Corporation and sold under the tradename "Grafoil".

Radiometer viewports 441 and 442 are provided in the main assembly section 400. Viewports 441 and 442 enable observation and measurement of the temperature of the reaction zone 404 of the reactor tube 401.

D. POST-REACTION TREATMENT ASSEMBLY

As shown in FIG. 1C, a first flange portion 502 of the post-reaction treatment assembly pressure vessel section 501 is secured in a fluid-tight manner to a fluid-cooled interface flange 503 which, in turn, is secured in a fluid-tight manner to the second pressure vessel main assembly section flange 415. A coolant channel 504 is defined between post-reaction treatment assembly cooling jacket 505 and the post-reaction treatment assembly pressure vessel section 501. Coolant flows into the channel 504 through inlet 506 and exits through outlet 507. Radiometer viewport 509 is provided to enable observation and temperature measuement within the post-reaction zone 422 of the reactor tube 401.

Figure 1D:
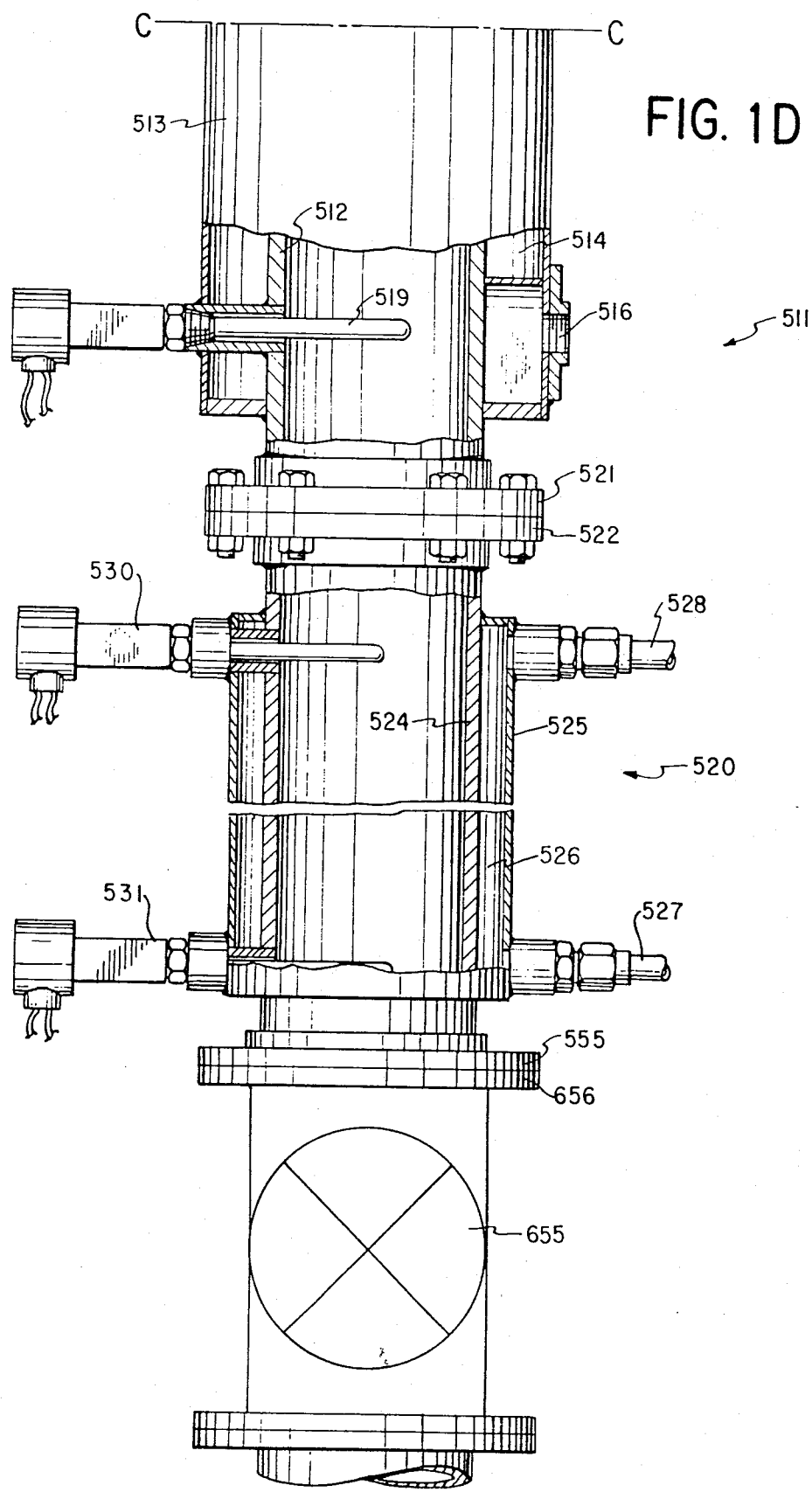

Reaction products exiting the outlet end 403 of the reactor tube 401 pass into a first section 510 of heat sink 511. As shown in FIGS. 1C and 1D, the first section 510 of the heat sink 511 includes an inner tubular wall 512 and an outer tubular wall 513 which define therebetween a coolant channel 514. Spiral coolant baffle 515 directs the coolant which enters through inlet 516 and exits through outlet 517. A first thermocouple probe 518 which extends into the first section 510 of the heat sink 511 enables the measurement of temperature of the entering reaction products. A second thermocouple probe 519 which extends into the first section 510 of the heat sink 511 measures the temperature of the reaction products about to exit.

Referring particularly to FIG. 1D, the first section 510 of the heat sink 511 is joined to a second section 520 by flanges 521 and 522, respectively. The second section 520 includes an inner wall 524 and an outer wall 525 which define therebetween a coolant channel 526. Coolant enters the channel 526 through inlet 527 and exists through outlet 528. Theremocouple probes 530 and 531 enable measurement of the temperature of reaction products entering the second section 520 and exiting the second section 520, respectively.

E. SOLID REACTANT FEED SYSTEM

Referring to FIG. 5, a solid reactant feed system 238 is shown in combination with a high-temperature reactor having an inlet assembly 200 of the type depicted in FIGS. 1A and 1B. A supply bin 240 for holding the solid reactant feeds a crusher 241, which, in turn, feeds a sieve 242. Coarse product output 245 of the sieve 242 is recycled to the crusher 241 and fine product output 243 is fed to a hopper 244 which is secured to an elongated tubular housing 246. Helical feed screw 247 is rotatably mounted within the housing 246 and is driven by motor 248. A pressure-sealing fluid may be introduced into the housing 246 through an inlet nozzle 249 located at a point downstream from the hopper 244; the interior of reactor tube 401 is thus sealed from the atmosphere. The solid reactant and the sealing fluid are discharged from housing 246 into the reactor through an outlet 250.

F. REFRACTORY COATING AND ETCHING SYSTEMS

For reasons set forth below, it is contemplated that a refractory coating may be deposited on surfaces of reactor tube 401 and heat shield 410 which are exposed to the blanket gas and to high temperatures during operation of the reactor. Such refractory coating may be, for example, pyrolytic carbon or a refractory oxide such as thorium oxide, magnesium oxide, zinc oxide, aluminum oxide, or zirconium oxide. It is further contemplated that portions of the surface of the reactor tube 401 may be selectively etched or eroded.

Figure 6:
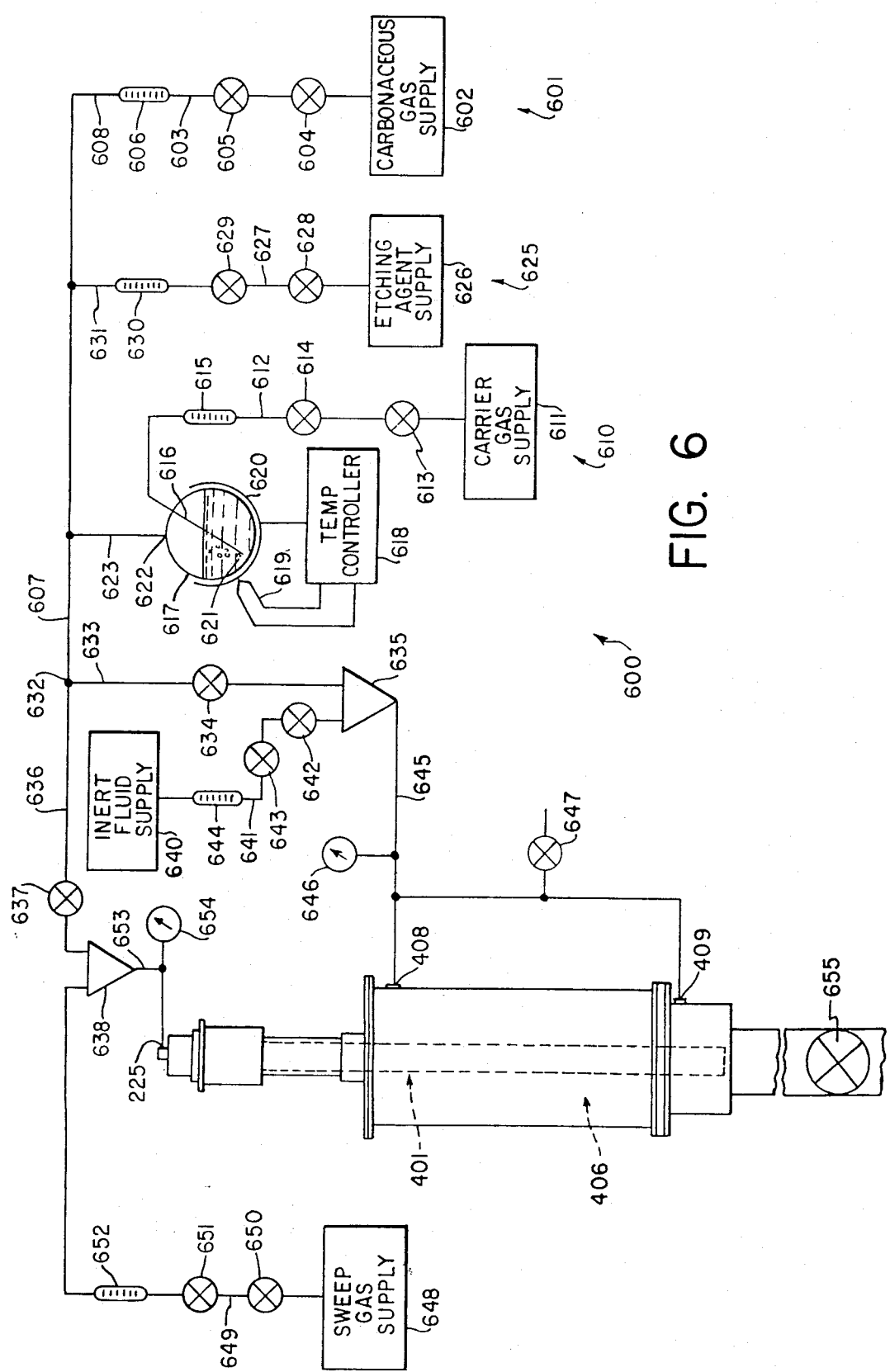
FIG. 6 is a schematic representation illustrating the refractory coating and etching systems of the reactor of the present invention.

Referring to FIG. 6, a refractory coating and etching system 600 is schematically represented and comprises a first refractory deposition agent metering system 601 having a carbonaceous gas supply 602 connected to a cabonaceous gas metering line 603. The metering line 603 has an on/off valve 604 connected to a needle valve 605 and a flow meter 606. A first feeder line 608 connects the cabonaceous gas metering line 603 to an admixture gas supply line 607.

A second refractory deposition agent metering system 610 includes a carrier gas supply 611 connected to a carrier gas metering line 612 which has an on/off valve 613, a needle valve 614, and a flow meter 615. The carrier gas metering line 612 is connected to a bubble tube 616 disposed within a tank 617 which contains a solution of a volatile metal-containing compound. The temperature of the tank 617 is regulated by a temperature controller 618 which senses the temperature of the tank by a thermocouple 619 and supplies heat to the tank, as required, by an electric heating mantle 620. An outlet end 621 of bubble tube 616 is submerged in the solution contained in the tank 617. An outlet 622 of the tank 617 connects a second feeder line 623 to the tank 617 at a point above the solution surface. The second feeder line 623 is also connected to the admixture gas supply line 607.

In an etching agent metering system 625, an etching agent supply 626 is connected to an etching agent metering line 627 which includes, in series, an on/off valve 628, a needle valve 629, and a flow meter 630. Connected to the etching agent metering line 627 is a third feeder line 631, which is connected to the admixture gas supply line 607.

The three lines 608, 623, and 631, all feed into the admixture gas supply line 607, which branches at a T-joint 632. A first branch line 633 includes a first branch line valve 634 and is connected to a first inlet of an inert fluid mixing manifold 635. A second branch line 636 includes a second branch line valve 637 and is connected to a first inlet of a sweep gas mixing manifold 638.

An inert fluid supply 640 is connected to an inert fluid metering line 641 which includes an on/off valve 642, a needle valve 643 and a flow meter 644 which is connected to a second inlet of inert fluid mixing manifold 635. An outlet of mixing manifold 635 is connected to an inert fluid supply line 645 which, in turn, is connected to the pressure vessel inlets 408 and 409 for directing the inert fluid into the inert fluid plenum 406. A plenum pressure sensor 646 is connected to the inert fluid supply line 645 and is in communication with the plenum 406 for measuring the pressure of the inert fluid within the plenum. A plenum exhaust valve 647 is also connected to the inert fluid supply line 645 and provides an outlet for discharging fluid from the plenum.

A sweep gas supply 648 is connected to a metering line 649 which includes an on/off supply valve 650, a needle valve 651, and a flow meter 652 which is connected to a second inlet of the sweep gas mixing manifold 638. An outlet of mixing manifold 638 is connected to a sweep gas supply line 653 which, in turn, is connected to the sweep gas inlet fitting 225 for introducing the sweep gas into the interior of the reaction tube 401. A reaction zone pressure sensor 654 which connects to the sweep gas supply line 653 and which communicates with the interior of the reactor tube 401, measures the pressure in the reaction zone of the reactor.

As shown best in FIG. 1D, a reactor tube outlet closure valve 655 is secured to the second section 520 of the heat sink 511 by flanges 555 and 656.

When the reactor is in operation, a pressure differential must be maintained between the inert fluid in plenum 406 and gas in the reactor tube 401 to cause a uniform flow of inert fluid radially inward through the porous walls of the tube 401 and the tube 310. It is thus advantageous that the fabric of tube 401 be sufficiently stiff that the pressure differential may be maintained without inward collapse of the tube 401. Accordingly, it is contemplated that a refractory coating such as pyrolytic carbon be deposited upon portions of the fibrous refractory material of the reactor tube 401 which are disposed within the black body cavity to increase the stiffness or dimensional stability of the fabric.

To deposit such coating, reactor tube outlet closure valve 655 is closed and the reactor tube 401 is heated to about 3450° F. Next, the on/off valve 650 in the sweep gas metering line 649 is opened, the on/off valve 642 in the inert fluid metering line 641 is closed, and the plenum exhaust valve 647 is opened, permitting sweep gas to flow into the interior of the reactor tube 401, then radially outwardly through the porous wall of the tube 401 into the plenum 406, and, finally through the pressure vessel inlets 408 and 409 and the plenum exhaust valve 647. This tends to expand the tube 401 to its maximum diameter. Thereafter, the on/off valve 604 in the carbonaceous gas metering line 603 is opened. The needle valves 605 and 651 are adjusted to set the flow rates of the carbonaceous gas and the sweep gas, respectively, to suitable values as registered on flow meters 606 and 652. The first branch line valve 634 is closed and the second branch line valve 637 is opened so that the carbonaceous gas flows through the first feeder line 608, the admixture gas supply line 607, the T-joint 632, the second branch line 636, and into the sweep gas mixing manifold 638 where it mixes with the sweep gas and flows into the interior of the reactor tube 401 through sweep gas supply line 653 and sweep gas inlet fitting 225.

The carbonaceous gas dissociates on the heated surfaces which it contacts, depositing a pyrolytic graphite coating. Thus, pyrolytic graphite is generally deposited on the portions of the reactor tube 401, and the heat shield 410 which are within the black body cavity.

To control the rate of flow of inert fluid through the walls of the reactor tube 401, the diameter of the pores in the tube wall may be reduced or enlarged while the reactor is in operation by mixing a refractory deposition agent or an etching agent with the inert fluid. The pressure differential between the plenum and the reaction zone may be monitored by the pressure sensors 646 and 654 and the rate of flow of inert fluid through the wall may be monitored by the flow meter 644.

When the pressure differential becomes too low for the desired rate of flow of inert blanket gas, the diameter of the pores in the tube of the reactor wall may be reduced by opening the on/off valve 604 and adjusting the needle valve 605 to allow a carbonaceous gas from the carbonaceous gas supply 602 to flow through carbonaceous gas metering line 603. The second branch line valve 637 is closed and the first branch line valve 634 is opened to direct the carbonaceous gas into the inert fluid mixing manifold 635 and thence into the plenum 406 through the inert fluid supply line 645 and the pressure vessel inlets 408 and 409. The plenum exhaust valve 647 remains closed and the reactor tube outlet closure valve 655 remains open during normal operation of the reactor. The carbonaceous gas dissociates on the heated surfaces within the reactor which it contacts. Accordingly, carbonaceous gas which flows into the pores of the fabric of the wall of reactor tube 401 dissociates, depositing a coating of pyrolytic graphic which reduces pore diameter. Since the pressure differential across the reactor tube wall will increase for a fixed flow of inert fluid, the decrease in porosity of the tube may be monitored with pressure sensors 654 and 646 and flow meter 644 as the graphite is deposited. When the pressure differential exceeds a predetermined value, the growth of the graphite coating may be halted by closing the on/off valve 604 in the carbonaceous gas metering line 603. The entire process of reducing the diameter of the pores in the reactor tube wall may be carried out without interrupting the operation of the reactor.

Conversely, it may be necessary to increase the diameter of the pores of the reactor tube 401. In this case, an etching agent such as steam or molecular oxygen from the etching agent supply 626 is mixed with the inert fluid by opening valve 628, adjusting needle valve 629 in the etching agent metering line 627, closing the second branch line valve 637, and opening the first branch line valve 634. The etching agent mixes with the inert fluid in inert fluid mixing manifold 635 and flows into the plenum 406 through the pressure vessel inlets 408 and 409. The etching agent attacks heated surfaces which it contacts, thereby increasing the diameter of the pores of the heated portion of the reactor tube 401. The flow of etching agent may be continued until pressure sensors 654 and 646 indicate a sufficiently low pressure differential across the reactor tube 401 for the desired rate of flow of inert fluid as monitored by flow meter 644. As with reducing the pore diameter with the carbonaceous gas, this process may be carried out while the reactor is in operation.

It may be advantageous in some applications to use steam or another medium which reacts chemically with the materials being processed as the inert fluid. To prevent or, at least, to retard the corrosion of materials of which the reactor is constructed, it is contemplated that a coating of a refractory oxide such as thorium oxide, magnesium oxide, zinc oxide, aluminum oxide, or zirconium oxide be deposited on the portions of the reactor tube 401 and heat shield 410 which come into contact with the inert fluid and operate at high temperatures. To deposit a coating of refractory oxide, a refractory deposition agent which is a volatile metal-containing compound such as methylmagnesium chloride, megnesium ethoxide, or zirconium-n-amyloxide may be employed. Methylmagnesium chloride, for example, decomposes on a surface heated to about 1100° F. to deposit a coating of magnesium metal. The hot magnesium metal is subsequently oxidized by introducing steam or molecular oxygen into the plenum 406. Zirconium-n-amyloxide and magnesium ethoxide both generally decompose on heated surfaces to form zirconium oxide or magnesium oxide respectively.

Referring to FIG. 6, the volatile metal-containing compound may be introduced into the plenum 406 by causing a carrier gas from the supply 611 to flow through the metering line 612 by opening the on/off valve 613. The needle valve 614, adjusts carrier gas flow rate to a suitable value as measured by flow meter 615. The tank 617 contains, for example, a solution of the volatile metal containing compound such as methylmagnesium chloride dissolved in diethyl ether or zirconium-n-amyloxide dissolved in tetrahydrofuran. The carrier gas flows through the bubble tube 616 and into the solution of tank 617. The second branch line valve 637 remains closed and the first branch line valve 634 remains open in order that the carrier gas, solvent vapor, and metal-containing compound vapor are directed sequentially through the outlet 622 of the tank 627, the second feeder line 623, the admixture gas supply line 607, and the first branch line 633, and into the inert fluid mixing manifold 635 where they are mixed with the inert fluid 635 and then carried to the plenum 406 over the inert fluid supply line 645 and through the pressure vessel inlets 408 and 409. The volatile, metal-containing compound decomposes on hot surfaces which it contacts within the reactor. If it decomposes into a pure metal, oxygen or steam are subsequently introduced into the plenum 406 to cause formation of the oxide.

G. PROCESS VARIABLE CONTROL SYSTEMS

Figure 7:
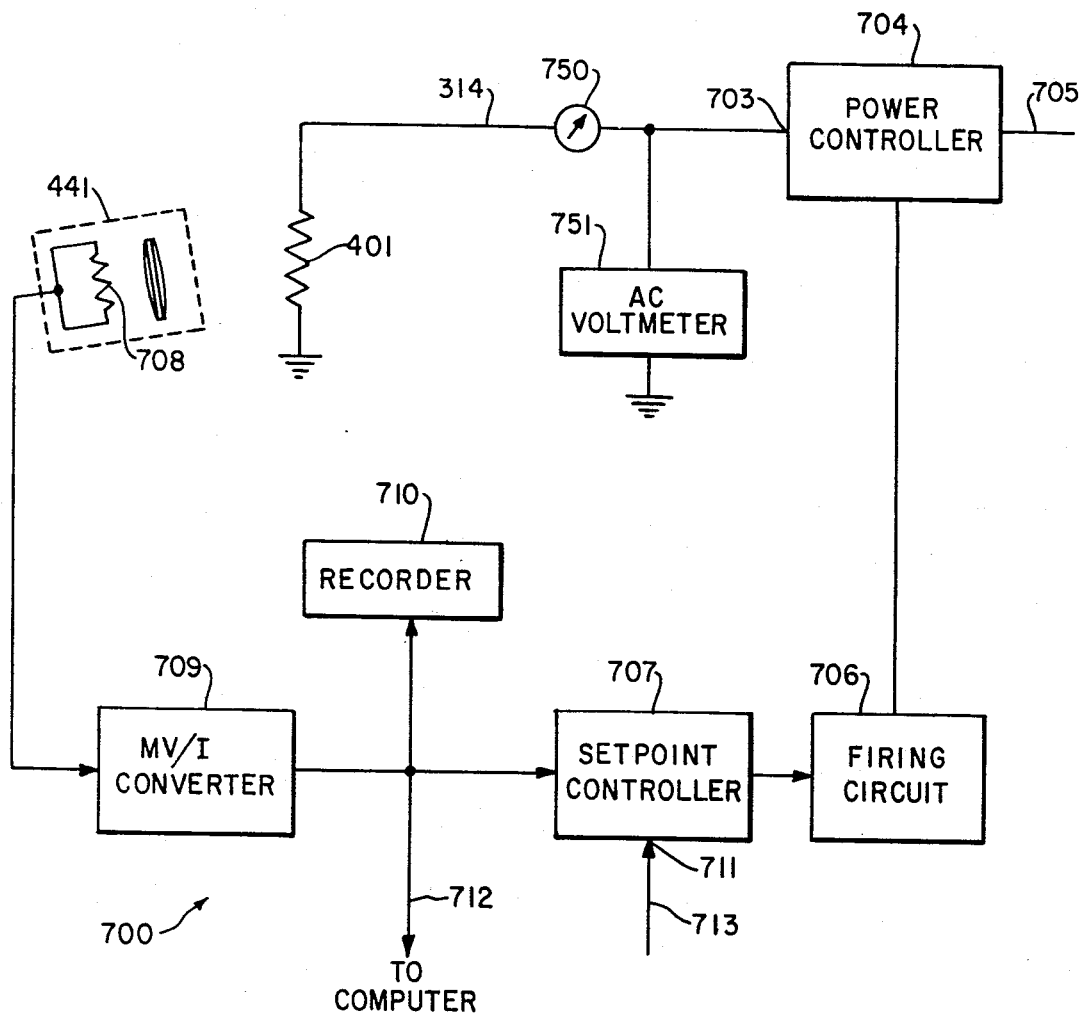
FIG. 7 is a schematic diagram of the temperature regulation circuit of the reactor of the present invention.

FIG. 7 illustrates a reactor temperature control system 700. There the electrically resistive reactor tube 401 is depicted in schematic form as a resistor, one end being connected to ground and the other end being connected to the electric power supply conduit 314. The electric power conduit 314 connects to an electric power output 703 of a power controller 704, which, in turn, connects to an AC power line 705 and a firing circuit 706. In this embodiment it is contemplated that power controller 704 include an SCR circuit in series with power line 705 for producing a variable AC voltage at the electric power output 703. Other embodiments may employ DC voltages as circumstances warrent. The AC power line 705 supplies electric power for heating the reactor. A radiometer 708 disposed within the viewport 441 of FIG. 1B is focussed on the reactor tube 401 and produces a signal, generally in the millivolt range, which corresponds to the temperature of the heating element. An "MV/I" converter 709 amplifies the radiometer signal and converts it to an electric current. A setpoint controller 707, an output signal line 712 for connection to a computer (not shown), and a recorder 710 which makes a permanent log of the temperature measured by the radiometer 708 are all connected to the converter 709. An input signal line 713 connects a control signal input 711 of the setpoint controller 707 to a computer (not shown). A current meter 750 is inserted in the electric power supply conduit 314 to measure the current supplied to the reactor tube 401; and an AC voltmeter 751 is tied to the supply conduit 314 to measure the voltage across the reactor tube 401. The power dissipated in the reactor tube and its electrical resistance can be calculated from such voltage and current measurements. Knowledge of the electrical resistance of the reactor tube provides information as to its physical integrity since, as the reactor tube erodes, its electrical resistance increases.

Figure 8:
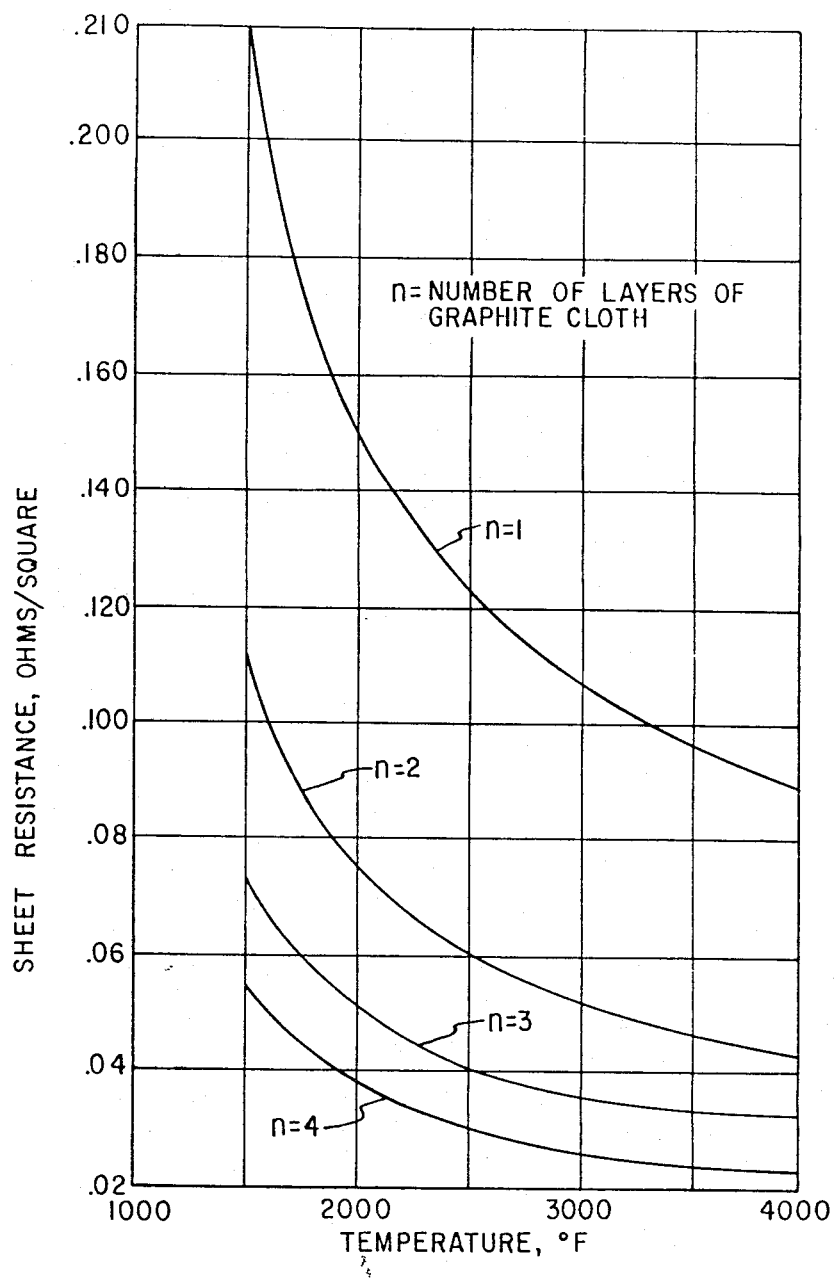
FIG. 8 is a graphical representation of the electrical resistance of a sample of carbon cloth as a function of temperature and the number of layers of refractory fabric which constitute such sample.

FIG. 8 is a graph of the electrical sheet resistance of a sample of graphite cloth (sold under the trade name of "WCA Graphite Cloth" by Union Carbide Corporation) as a function of the temperature of the cloth. The cloth has been stiffened with pyrolytic graphite by heating and exposing it to an atmosphere of a carbonaceous gas, generally according to the procedure described above. The vertical axis of the FIG. 8 graph gives the sheet resistance in units of "ohms per square" since, as is known, the resistance measured between opposing edges of squares of a resistive material of a given thickness is independent of the dimensions of the square. Thus, the resistance at a particular temperature of a reactor tube formed from a single rectangular strip of "WCA Graphite Cloth" may be found by considering the strip to be made up of squares of the cloth connected in series. For example, the resistance of a strip 6 inches by 51 inches at 2500° F measured between the two six-inch sides is found by multiplying (51/6) times 0.123 ohms, the sheet resistance at 2500° F given on FIG. 8. The resistance of a reactor tube made up of more than one layer of fabric, each layer having the same dimensions and therefore the same resistance, is found by dividing the resistance of a single layer by the number of layers. For convenience, the calculated sheet resistances in "ohms per square" for samples of stiffened "WCA Graphite Cloth" made up of 2, 3, and 4 layers have also been graphed on FIG. 8.

In operation, after the setpoint controller 707 is set to a specified temperature either manually or by a computer, it compares such temperature with the measured temperature of the reactor 401 and produces an error signal which depends upon the algebraic difference between the measured temperature and the specified temperature. The setpoint controller 707 controls the firing circuit 706, which, in response to the error signal, causes the power controller 704 to increase or decrease the power supplied to the reactor tube to reduce, as necessary, the magnitude of the error signal, causing the temperature of the reactor tube 401 to approach the specified temperature. Because the reactor tube 401 is within the black body cavity enclosed by the heat shield 410, its temperature is generally representative of the temperature of surfaces throughout the cavity. However, radiometers focussed on other surfaces within the black cavity may also be used for temperature control.

As shown in FIG. 9, process variables in addition to temperature may be regulated by feedback control systems as, for example, a principal liquid reactant feed rate regulation system 714 which includes a supply 715 communicating with a metering system 716 over a feed line 717. The metering system 716 controls the flow rate of the principal reactant and may include, for example, a variable speed pump and pump controller or a variable orifice valve and valve controller. An output 718 of the principal reactant metering system 716 is connected to a flow rate transducer 719 which produces an electrical signal output 720 corresponding to the rate of flow of the principal reactant. An output 721 of the principal reactant flow rate transducer 719 is connected to the reactant inlet 233. A signal output 722 of the reaction zone pressure sensor 654 and the signal output 720 of the flow rate transducer 719 are connected to the first and second signal inputs, respectively, of the principal reactant metering system 716. An output of a computer system 723 is connected to a third input of the metering system 716.

In one mode of operation of the principal liquid reactant feed rate regulation system 714, the computer system 723 communicates both a pre-selected value for the principal reactant flow rate and an upper limit for the reaction zone pressure to the principal reactant metering system 716 which compares the pre-selected flow rate with that measured by the transducer 719 and adjusts the flow rate to approach the selected value, provided, however, that the reaction zone pressure is below the prescribed upper limit. Should the reaction zone pressure exceed this upper limit, the metering system 716 will lower the pressure by reducing the flow rate of the principal reactant.

A secondary liquid reactant flow rate regulation system 724 is another feedback control system which includes a supply 725 communicating with a metering system 726 over a feed line 727. The secondary reactant metering system 726 may be of the same type as the principal reactant metering system 716. An output 728 of the secondary reactant metering system 726 is connected to a flow rate transducer 729 which produces a signal corresponding to the rate of flow of the secondary reactant. An output 731 of the transducer 729 is connected to the reactant inlet 221. A signal output 722 of the reaction zone pressure sensor 647 and a signal output 730 of the secondary reactant flow rate transducer 729 are connected to separate signal inputs of the secondary reactant metering system 726, and an output of the computer system 723 is connected to a third input. The secondary liquid reactant flow rate regulation system 724 may be operated in a mode analagous to that described above for the principal liquid reactant regulation system 714.

In an inert fluid flow rate regulation system 734, an output of the inert fluid supply 640 is connected to the needle valve 643, which, in turn, is connected to the on/off valve 642. Valve 642 is connected to an inert fluid flow rate transducer 735. A signal output 736 of the transducer 735 is connected to a first input of an inert fluid needle valve controller 737. A second input of the needle valve controller 737 is connected to the computer system 723 and a third input is connected to the plenum pressure sensor 646. The opening of the needle valve 648 may be set by the controller 737. An inert fluid output of transducer 735 is connected to the pressure vessel inlets 408 and 409 of the reactor. For convenience, the plenum exhaust valve 647, flow meter 644 and inert fluid mixing manifold 535, of FIG. 6 are not shown in FIG. 9, and the inert fluid flow rate transducer 735 of FIG. 9 is not shown in FIG. 6.

In operation, the on/off valve 642 is opened, allowing the inert fluid to flow through transducer 735 and into the inlets 408 and 409. The needle valve controller 737 compares a flow-rate signal from the transducer 735, to a flow rate specified by the computer system 723 and adjusts needle valve 648 accordingly, provided, however, that the plenum pressure as sensed by pressure sensor 646 does not exceed an upper limit also specified the by computer system 723. If the pressure is excessive, the needle valve controller 737 reduces the flow rate to lower the pressure.

A reactor temperature control system 700, shown in detail in FIG. 7 and depicted schematically in FIG. 9, comprises a reactor temperature controller 738 which includes the power controller 704, firing circuit 706, set point controller 707, converter 709, recorder 710, and meters 750 and 751 shown in FIG. 7. The radiometer 708 (not shown in FIG. 9) is housed within the viewport 441 and connected to the controller 738. The electric power supply conduit 314 connects the electric power output 703 of the reactor temperature controller 738 to the reactor tube 401 (not shown in FIG. 9). Thus, the level of electrical power supplied at the electric power output 703 determines the temperature of the reactor tube 401. The control signal input 711 and an output of the reactor temperature controller 738 are connected to the computer system 723 by the input signal line 713 and the output signal line 712, respectively.

A reactor product sampler 740, connected to an outlet 741 located adjacent the reactor outlet closure valve 655, transfers at preselected time intervals samples of reaction product into a sample inlet 742 of a gas chromatograph 743. An electrical signal at an output 744 of the chromatograph 743 responds to changes in the chemical composition of the samples. For example, the gas chromatograph 743 in conjunction with the reaction product sampler 740 may produce a signal which corresponds to the concentration of ethylene in a process for the partial pyrolysis of a hydrocarbon.

Outputs of the gas chromatograph 743 are connected to a recorder 749 and the computer system 723. An input 745 of the computer system 723 is connected to transducers for the process variables by a data bus 746, which includes signal lines connected to the flow rate transducers 719, 729 and 735, pressure sensors 646 and 654, temperature controller 738, and gas chromatograph 743. Other transducers may be tied to the data bus 746 as desired. An output 747 of the computer system 723 is connected to a command bus 748 which includes signal lines tied to the principal reactant metering system 716, secondary reactant metering system 726, reactor temperature controller 738, and inert fluid needle valve controller 737. The computer system 723 may include a digital computer, an analog-to-digital converter for converting analog signals of the transducers to digital data for the computer, a digital-to-analog converter for converting digital signals from the computer to analog control signals, and a multiplexer for switching among signal lines in the data bus 746 and the command bus 748.

It is contemplated that during a process run the computer system 723 may specify and monitor process variables by signals communicated over the command bus 748 and the data bus 746. Thus, the computer system 723 may supervise the operation of the reactor to ensure that process variables remain within specified ranges. Moreover, the computer may be programmed to search for optimum operating conditions for a particular process by making systematic variations in the process variables while monitoring the output of the reactor with the chromatograph 743. For example, the computer may be programmed to search for reactor temperatures and feedstock flow rates which maximize the ethylene concentration in the output for a particular hydrocarbon feedstock. The computer system 723 may also be incorporated in feedstock control systems such as a reaction product control system which includes in addition to the computer system 723 the reaction product sampler 740, the gas chromatograph 743, the reactor temperature controller 738, and the electric power supply conduit 314 connected to the reactor tube. In this reaction product control system, the computer system compares the chemical composition of samples of reaction product withdrawn from the reactor to a preselected composition and generates an electrical signal at its output 747 corresponding to deviations in the chemical composition of the samples. The output 747 of the computer system 723 is connected to the input 711 of the reactor temperature controller to enable variation of the temperature of the reactor tube in response to changes in the signal from the computer system, reducing the deviations in the chemical composition of the reaction products. Other process variables such as the feedrates of selected reactants and the pressure in the reaction zone may also be controlled by similar feedback control systems.

UTILIZATION OF THE FLUID-WALL REACTORS

The fluid-wall reactors of the invention may be used in virtually any high temperature chemical reaction, many of which reactions have been previously regarded as either impractical or only theoretically possible. The most important criterion for utilizing these fluid-wall reactors in a particular high temperature chemical reaction is whether such reaction is themodynamically possible under the reaction conditions. Utilizing these fluid-wall reactors, such high temperature chemical reaction processes can be conducted at temperatures up to about 6000° F. by (1) generating within the interior of the porous reactor tube an annular envelope consituting an inert fluid which is substantially transparent to radiant energy to form a protective blanket for the radially inward surface of the reactor tube, the annular envelope having substantial axial length and the interior of the envelope defining a reaction chamber; (2) passing at least one reactant (which may be either in solid, liquid or gaseous state) through the reaction chamber along a predetermined path substantially coincident with the longitudinal axis of the envelope, the reactants being confined within the reaction chamber; and (3) directing high intensity radiant energy into the reaction chamber to coincide with at least a portion of the predetermined path of the reactants, sufficient radiant energy being absorbed within the reaction chamber to raise the temperature of the reactants to a level required to initiate and sustain the desired chemical reaction.

Among the reactions which may be carried out in the fluid-wall reactors of the invention are the dissociation of hydrocarbons and hydrocarbonaceous materials, such as coal and various petroleum fractions, into hydrogen and carbon black; the steam reforming of coal, petroleum fractions, oil shale, tar sands, lignite, and any other carbonaceous or hydrocarbonaceous feedstock into synthesis gas mixtures, which processes may also include the optional use of one or more inorganic carbonates (such as limestone or dolomite) or inorganic oxides to chemically react with any sulfur-containing contaminants such that they may be removed from the resultant synthesis gas mixtures; the partial dissociation of hydrocarbons and hydrocarbonaceous materials into lower molecular weight compounds; the partial pyrolysis of saturated hydrocarbons into unsaturated hydrocarbons, such as ethylene, propylene and acetylene; the conversion of organic waste materials, such as sewage sludge or lignin-containing by-products, into a fuel gas; the complete or partial desulfurization of sulfur-containing hydrocarbonaceous feedstocks; the reduction of mineral ores or inorganic compounds to a lower valence state with hydrogen, carbon, synthesis gas, or other reducing agent; and the partial or complete reaction of an inorganic element or compound with a carbonaceous material to form the corresponding inorganic carbide.

If desired, one or more catalysts may be used in such high temperature chemical reaction rocesses to accelerate the reaction or to change its course to a desired reaction sequence. Where such processes involve carbonaceous or hydrocarbonaceous reactants, the addition of an appropriate catalyst to the system may be used to promote the formation of free radicals, carbonium ions or cabanions to influence the course of the reaction.

Of course, no one set of operating conditions is optimum or appropriate for all reactions which may be carried out in the fluid-wall reactor. Operating conditions, such as temperatures, pressures, rates of feed, residence time in the reactor tube, and rates of cooling, may be varied to match the requirements for the particular reaction conducted. By way of illustration, among the factors which influence the products of the pyrolysis of a hydrocarbon are the temperature to which the hydrocarbon is heated and the length of time it is maintained at that temperature. It is known, for example, that methane must be heated to about 2250° F. in order to produce acetylene. Ethylene formation from ethane begins at a lower temperature, about 1525° F. In a typical process for pyrolyzing hydrocarbons, acetylene, ethylene, hydrogen, carbon black, and hydrocarbon oils are produced. Reaction times on the order of a millisecond generally maximize the yield of acetylene, since reaction times of greater than a millisecond generally favor the production of ethylene and other products at the expense of acetylene, while reaction times of less than a millisecond generally reduce the yields of both ethylene and acetylene. Very high temperatures, for example in excess of 3000° F., generally favor the production of carbon black and hydrogen at the expense of acetylene and ethylene. Reaction times in the fluid-wall reactors of the invention may be shortened by shortening the the reactor tube and by increasing the rate of flow of reactants introduced into the reactor tube. For very short reaction times, it may be advantageous to mix a radiation-absorbing target, such as carbon black, with the reactants in order to promote efficient coupling between the reactant stream and the thermal radiation from the tube wall and thereby facilitate heating the reactants quickly.

I claim:

1. A high temperature fluid-wall reactor in which substantially all of the heat is supplied by radiation coupling, characterized by
    A. a reactor tube having an inlet end and an outlet end, the interior of the tube defining a reactor chamber, the reactor tube being made of an electrically resistive, porous refractory material capable of emitting sufficient radiant energy to raise the temperature of reactants within the reactor tube to a level required to initiate and sustain the desired chemical reaction; the pores of the refractory material being of such diameter as to permit a uniform flow of sufficient inert fluid which is substantially transparent to radiant energy through the tube wall to constitute a protective blanket for the radially inward surface of the reactor tube;
    B. a fluid-tight, tubular pressure vessel enclosing the reactor tube to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber;

C. means for introducing at least one reactant into the reactor chamber through the inlet end of the reactor tube, the reactants being directed in a predetermined path axially of the reactor tube and being confined by the protective blanket substantially centrally within the reactor chamber and out of contact with the inner wall of the reactor tube;

D. means for passing an electric current through the reactor tube for heating the reactor tube to the temperature level at which it emits sufficient radiant energy to initiate and sustain the desired chemical reaction, the radiant energy being directed centrally therewithin substantially coincident with at least a portion of the path of the reactants; and E. a circumferential heat shield disposed within the pressure vessel and radially outwardly of the reactor tube, the heat shield reflecting radiant energy toward the reactor tube.

2. A high temperatures fluid-wall reactor according to claim 1, further including means for introducing a radiant energy absorptive target into the reactor chamber coincident with at least one point along the path of the reactants which are transparent to radiant energy, sufficient radiant energy being absorbed by the target to raise the temperature of the reactants to a level required to initiate the desired chemical reaction.

3. A fluid-wall reactor according to claim 2, in which the target is a liquid.

4. A fluid-wall reactor according to claim 2, in which the target is a gas which exhibits absorption in the electromagnetic spectrum from about 100 microns to about 0.01 microns.

5. A fluid-wall reactor according to claim 2, in which the target is finely divided carbon powder which is introduced through the inlet end of the reactor tube along a predetermined path coincident with the path of the reactants.

6. A fluid-wall reactor according to claim 2, in which the target is a solid element which is disposed in the reactor chamber along at least a portion of the path of the reactants.

7. A fluid-wall reactor according to claim 6, in which the solid element is made of carbon.

8. A fluid-wall reactor according to claim 1, further including means disposed within the reactor chamber coincident with at least a portion of the path of the reactants for raising the temperature of the reactants to a level required to initiate the desired chemical reaction.

9. A fluid-wall reactor according to claim 8, in which the means for raising the temperature of the reactants comprises an electrically heated element.

10. A fluid-wall reactor according to claim 8, in which the means for raising the temperature of the reactants comprises an electric arc.

11. A fluid-wall reactor according to claim 8, in which the means for raising the temperature of the reactants comprises a flame.

12. A fluid-wall reactor according to claim 1, in which the electrically resistive, porous material is graphite or carbon.

13. A fluid-wall reactor according to claim 1, further including means for cooling the pressure vessel.

14. A fluid-wall reactor according to claim 13, in which the means for cooling the pressure vessel comprises cooling coils disposed about the outer surface of the pressure vessel.

15. A fluid-wall reactor according to claim 1, in which the diameter of the pores in the reactor tube is in the range of about 0.001 to 0.020 inch.

16. A fluid-wall reactor for high temperature chemical reactions, in which reactor substantially all of the heat is supplied by radiation coupling, comprising:

A. a reactor tube having an inlet end and an outlet end, at least a portion of the interior of the tube defining a reaction zone, the reactor tube being made of a fabric of an electrically resistive, fibrous refractory material capable of emitting sufficient radiant energy to raise the temperature of reactants within the reaction zone to a level required to initiate and sustain the desired chemical reaction; the fabric having a multiplicity of pores of such diameter as to permit a uniform flow of sufficient inert fluid which is substantially transparent to radiant energy through the tube wall to constitute a protective blanket for the radially inward surface of the reactor tube;

B. a fluid-tight, tubular pressure vessel enclosing the reactor tube to define an inert fluid plenum between the reactor tube and the pressure vessel, the inlet and outlet ends of the reactor tube being sealed from the plenum; the pressure vessel having at least one inlet for admitting the inert fluid which is directed under pressure into the plenum and through the porous tube wall into the reaction zone;

C. means for introducing at least one reactant into the reaction zone through the inlet end of the reactor tube, the reactants being directed in a predetermined path axially of the reactor tube and being confined by the protective blanket substantially centrally within the reaction zone and out of contact with the inner wall of the reactor tube;

D. means for passing an electric current through the reactor tube for heating the reactor tube for heating the reactor tube to the temperature level at which it emits sufficient radiant energy to initiate and sustain the desired chemical reaction, the radiant energy being directed into the reaction zone substantially coincident with at least a portion of the path of the reactants; and E. a heat shield disposed within the pressure vessell substantially enclosing the reaction zone to define a black body cavity, the heat shield reflecting radiant energy inwardly toward the reaction zone.

17. A fluid-wall reactor according to claim 16, in which the electrically resistive, fibrous refractory material is graphite or carbon.

18. A fluid-wall reactor according to claim 16, including means for depositing a refractory coating upon portions of the fibrous refractory material of the reactor tube which are disposed within the black body cavity to increase the rigidity of the fabric.

19. A fluid-wall reactor according to claim 18, in which the refractory coating depositing means includes sensors to determine the pressure differential between the plenum and the reaction zone, metering means for dispensing a refractory deposition agent into the inert gas stream, and reactor tube outlet closure means, the inert gas stream containing the deposition agent being directed into the reaction zone and radially outwardly through the tube wall into the inert fluid plenum.

20. A fluid-wall reactor according to claim 16, further including means for enlarging the diameter of the pores in the fabric to increase the flow of inert fluid through the tube wall.

21. A fluid-wall reactor according to claim 20, in which the means for enlarging the diameter of the pores includes sensors to determine the pressure differential between the plenum and the reaction zone and metering means for dispensing an etching agent into the inert gas stream.

22. A fluid-wall reactor according to claim 16, further including means for reducing the diameter of the pores in the fabric to decrease the flow of inert fluid through the tube wall.

23. A fluid-wall reactor according to claim 22, in which the means for reducing the diameter of the pores includes sensors to determine the pressure differential between the plenum and the reaction zone and metering means for dispensing a refractory deposition agent into the inert gas stream.

24. A fluid-wall reactor according to claim 23, in which the refractory deposition agent is a carbonaceous gas.

25. A fluid-wall reactor according to claim 23, in which the refractory deposition agent is a volatile metal-containing compound.

26. A fluid-wall reactor according to claim 16, in which portions of the fibrous refractory material which are heated and exposed to the inert fluid have a coating of a refractory oxide.

27. A fluid-wall reactor according to claim 26, in which the refractory oxide is thorium oxide, magnesium oxide, zinc oxide, aluminum oxide, zirconium oxide or two or more mixtures thereof.

28. A fluid-wall reactor according to claim 16, further including a tubular bellows disposed within an inlet assembly section of the pressure vessel, an inlet end of the bellows being secured in a fluid-tight manner to the inlet assembly section and an outlet end of the bellows being secured to the inlet end of the reactor tube, the bellows being deformable to accomodate axial expansion and contraction of the reactor tube.

29. A fluid-wall reactor according to claim 16, further including means for applying an axial tensile force to the reactor tube.

30. A fluid-wall reactor according to claim 16, further including means for cooling the pressure vessel.

31. A fluid-wall reactor according to claim 16, in which a means for introducing a liquid reactant into the reaction zone of the reactor tube includes a fogging nozzle disposed within the reactor tube adjacent an inlet of the reaction zone, the liquid reactant and an atomizing gas being directed under pressure and mixed within the nozzle, the liquid reactant being dispersed from the nozzle outlet as a fog which absorbs radiant energy.

32. A fluid-wall reactor according to claim 31, in which the fogging nozzle includes a tubular shroud secured to and disposed radially outwardly of the nozzle, the axis of the shroud being substantially parallel to the axis of the reactor tube.

33. A fluid-wall reactor according to claim 31, including a plurality of fogging nozzles disposed within the reactor tube adjacent the inlet end of the reactor zone.

34. A fluid-wall reactor according to claim 31, in which the means for introducing a liquid reactant into the reaction zone further includes means for introducing a sweep gas into the inlet end of the reactor tube, the sweep gas directing the liquid reactant fog towards the reaction zone.

35. A fluid-wall reactor according to claim 16, further comprising a conductive tube made of an electrically conductive porous material, the conductive tube extending in the pressure vessel in axial allignment with the reactor tube and being joined at one end to the inlet end of the reactor tube, the interior of the conductive tube defining a pre-reaction zone into which inert fluid is directed through the porous walls of the conductive tube to form a protective blanket which assists in confining the reactants substantially centrally within the reaction zone and out of contact with the inner wall of the reaction tube, the conductive tube making electrical contact with the reactor tube for conducting electric current to the reactor tube.

36. A fluid-wall reactor according to claim 35, in which the electrically conductive, porous material is graphite or carbon.

37. A fluid-wall according to claim 16, in which means for introducing a solid reactant into the reaction zone of the reactor tube includes a helical feed screw rotatably mounted within an elongated tubular housing, drive means for rotating the feed screw, a hopper for inroducing a crushed, solid reactant into the housing, means for introducing a pressure sealing fluid into the housing at point downstream from the hopper, and outlet means for discharging the reactant and the sealing fluid from the housing into the reactor inlet.

38. A fluid-wall reactor according to claim 16, in which the heat shield is made of a graphitic material.

39. A fluid-wall reactor according to claim 16, further including reaction product cooling means disposed adjacent to the outlet end of the reactor tube.

40. In combination with a fluid-wall reactor for high temperature chemical reactions according to claim 16, a reaction product control system comprising:
A. means for withdrawing samples of reaction product exiting the reactor;
B. a reaction product analyzer including a sample inlet and a signal output, the analyzer comparing the chemical composition of the reaction product to a preselected composition and generating an electrical signal at its output corresponding to deviations in the chemical composition of samples being analyzed; and
C. a reactor temperature controller including a control signal input connected to the analyzer signal output and a heater power output connected to the electrical means for heating the reactor tube, the temperature of the reactor tube being varied in response to changes in the analyzer signal to reduce the deviations.

41. A reaction product control system according to claim 40, in which the reaction product analyzer comprises a gas chromatograph connected to a digital computer.

42. A reaction product control system according to claim 40, in which the means for withdrawing samples comprises means for transferring samples to the sample inlet of the of the reaction product analyzer at preselected time intervals.

43. A reaction product control system according to claim 40, in which the reactor temperature controller includes an SCR circuit connected in series with an AC power line.

* * * * *